(12) United States Patent
Hattori et al.

(10) Patent No.: US 7,586,215 B2
(45) Date of Patent: Sep. 8, 2009

(54) ID TAG

(75) Inventors: Wataru Hattori, Tokyo (JP); Hiroo Hongo, Tokyo (JP); Fumiyuki Nihei, Tokyo (JP); Hiroshi Sunamura, Tokyo (JP)

(73) Assignee: NEC Corporation, Tokyo (JP)

( * ) Notice: Subject to any disclaimer, the term of this patent is extended or adjusted under 35 U.S.C. 154(b) by 449 days.

(21) Appl. No.: 10/583,568

(22) PCT Filed: Dec. 17, 2004

(86) PCT No.: PCT/JP2004/018924

§ 371 (c)(1),
(2), (4) Date: Jun. 19, 2006

(87) PCT Pub. No.: WO2005/059817

PCT Pub. Date: Jun. 30, 2005

(65) Prior Publication Data

US 2007/0132590 A1    Jun. 14, 2007

(30) Foreign Application Priority Data

Dec. 19, 2003   (JP) ............................. 2003-423614

(51) Int. Cl.
*H01H 7/00* (2006.01)
(52) U.S. Cl. ......................................... 307/141; 726/33
(58) Field of Classification Search ................. 307/141; 705/64; 726/25, 33
See application file for complete search history.

(56) References Cited

U.S. PATENT DOCUMENTS

| | | | | |
|---|---|---|---|---|
| 6,046,676 | A  * | 4/2000 | Ward et al. ................ | 340/572.1 |
| 6,933,848 | B1 * | 8/2005 | Stewart et al. ........... | 340/572.3 |
| 7,129,844 | B2 * | 10/2006 | Pan ......................... | 340/572.3 |
| 7,132,947 | B2 * | 11/2006 | Clifford et al. ........... | 340/572.3 |

FOREIGN PATENT DOCUMENTS

| | | |
|---|---|---|
| CN | 1434958 | 8/2003 |
| JP | 58-140938 | 8/1983 |
| JP | 08-055205 | 2/1996 |
| JP | 08-162996 | 6/1996 |
| JP | 2001-134732 | 5/2001 |
| WO | WO 0161646 | 8/2001 |
| WO | WO 03/094227 A1 | 11/2003 |

* cited by examiner

*Primary Examiner*—Albert W Paladini
(74) *Attorney, Agent, or Firm*—Scully, Scott, Murphy & Presser, P.C.

(57) ABSTRACT

When a predetermined voltage is applied between electrodes (302), metal ions deposit in a solid electrolyte (308), and thereby a conduction channel (310) is formed therein. The solid electrolyte switch (300) is thus turned on. Because this deposition mechanism is reversible, application of reverse voltage between the electrodes of the solid electrolyte switch (300) already turned on makes the deposited metal atoms to migrate in the solid electrolyte to thereby thin the conduction channel 300, thereby the channel finally disappears, and the solid electrolyte switch (300) is turned into a non-conductive state. Use of this switch successfully realizes an IC tag which can automatically be nullified without artificial nullification.

19 Claims, 25 Drawing Sheets

(a)

(b)

(c)

ANTENNA TERMINAL

ID TAG

TECHNICAL FIELD

The present invention relates to an ID tag having a nullification unit.

BACKGROUND ART

Physical distribution using ID tags has been attracting public attention in recent years. The ID tag has a memory storing information on commodities, information on distribution history of commodities or the like, and is allowed to access the memory at any time when an external signal is received. A system using the ID tag enables an efficient management never available before.

On the other hand, this sort of system, capable of linking the product information with private information, is apprehended to invade consumers' privacy. For example, when a consumer buys a product having an ID tag integrated therein, it is anticipated that information in the tag may be read by a malicious third party, and this raises a possibility of tracing to what purpose the product is used, or what kind of products the customer carries.

As a preventive measures against such invasion of privacy, there is on-going development on a mechanism of nullifying functions of the ID tag.

Patent Document 1 describes an ID tag having such nullification mechanism. The nullification mechanism described in this document is composed of a fuse, and can disable the ID tag by allowing over-current to flow through the fuse to disconnect it.

Patent Document 2 describes a label having, as a nullification unit, a material which can be turned into electro-conductive by heating.

[Patent Document 1] Japanese-Laid Open Patent Publication "Tokkaihei" No. 8-55205; and

[Patent Document 2] Japanese-Laid Open Patent Publication "Tokkai" No. 2001-134732.

DISCLOSURE OF THE INVENTION

The conventional ID tag with the nullification mechanism, however, needs intentional nullification (by an operator or the like), and negligence of this processing may fail to safely protect personal information.

Another problem is that the nullification took place as described in the above directly means that the ID tag is disfunctioned and made unrecyclable. For an exemplary case where a consumer buys a product having the ID tag integrated therein, nullification on purchase makes it impossible for the consumer to enjoy a convenient function of the ID tag. Various system making use of the ID tag are under development at present, wherein a proposal is made on a system capable of, after foods with the ID tags were purchased and housed in a refrigerator, recognizing the foods in the refrigerator using the ID tags, and managing food inventory, variety and so forth. Nullification of the ID tags on purchase also makes it impossible to realize such highly-convenient system.

On the other hand, the ID tag is remained usable also after purchase if the function of the ID tag is kept effective, but adversely raises a fear of leakage of personal information and so forth through access by any other person.

The present invention conceived after considering the situation, and an object thereof is to provide an ID tag which can automatically be nullified without intentional nullification (by an operator or the like).

Another object of the present invention is to provide an ID tag configured as being regenerable even after once nullified, and made recyclable in a style of keeping security and of keeping privacy hidden.

According to the present invention, there is provided an ID tag which has a circuit including an antenna and an IC chip, and a nullification unit isolating the circuit; wherein the nullification unit includes a time switch isolating the circuit when a predetermined time limit for operation has reached after the start of use.

According to the present invention, the ID tag is automatically nullified after an elapse of a predetermined time limit for operation, and thereby can prevent personal information or the like from leaking due to nullification left forgotten. If the time limit for operation is appropriately set, it is also made possible to maintain the function of the ID tag only for a predetermined duration of time, allowing development of tag into systems of various purposes.

The time limit for operation referred to herein means duration of time of use, or the number of time of use. In other words, the ID tag is configured so as to allow the time switch to activate at the point of time when a predetermined time has elapsed, or the tag has been used a predetermined number of times after the start of use. The "time limit for operation" in the present invention is a concept involving a variety of modes, and examples of which include the followings:

(i) total time of application of the source voltage to the solid electrolyte switch, or, accumulating time of power source operation of an RFID tag (Embodiment 2 described later);

(ii) an elapse of time irrespective of use/disuse of the RFID, or power source operation (Embodiments 3 and 5 described later);

(iii) total time of flow of current from the power source to the narrow metal line, or accumulating time of power source operation of the RFID tag (Embodiment 4 described later); and (iv) time for diffusion of the metal ion, irrespective of use/disuse of the RFID, or power source operation (Examples 1 and 2 described later).

Length of time limit for operation can be set by adjusting structures or the like of the time switch.

In the ID tag of the present invention, the time switch may include a start unit activating the time switch, and may be configured so as to isolate the circuit when a predetermined time limit for operation has reached after the time switch was activated by the start unit.

In the ID tag of the present invention, the time switch may be provided in the circuit, and may be configured as being switched internally from a conduction state to a non-conduction state so as to isolate the circuit, when the predetermined time limit for operation has reached.

The ID tag of the present invention can be exemplified as follows:

(i) a configuration in which the time switch includes a first conductor provided in contact with the solid electrolyte film; a second conductor provided as being contact with the solid electrolyte film, and as being spaced by a predetermined distance from the first conductor; and a metal ion supplying section provided as being contact with the solid electrolyte film and as being spaced from the first and second conductors, the first and the second conductors being independently connected the circuit;

(ii) a configuration in which the time switch includes a narrow conductor line provided in the circuit; an air-tight compartment housing the narrow conductor line; and a start unit breaking the air-tightness of the air-tight compartment to thereby introduce the air or an oxidative gas into the compartment, configured as allowing the narrow conductor line to be oxidized and so as to isolate the circuit, when a predetermined time limit for operation has reached after the time switch was activated by the start unit; and (iii) a configuration in which the time switch includes a first and a second solid electrolyte films provided as being spaced from each other on a base; a first conductor provided in contact with the first solid electrolyte film; a second conductor provided in contact with both of the first and second solid electrolyte films; a third conductor provided in contact with the second solid electrolyte film; and a metal ion supplying section provided in contact with both of the first and second solid electrolyte films, as being spaced from the first, second and third conductors, the first and second solid electrolyte films being respectively composed of different materials, and the first and second conductors, and the second and third conductors are respectively provided as being spaced by a predetermined distance from each other, and the first and third conductors being respectively connected to the circuit.

In (ii) in the above, the ID tag may further include an oxidant compartment in which an oxidizer is housed, and may be configured so that the oxidant compartment and the air-tight compartment are communicated when the start unit is functionalized.

In the ID tag of the present invention, the time switch may include a first metal interconnection and a second metal interconnection provided in the circuit in parallel with each other, as being spaced by a predetermined distance; and a gap portion disposed between the first and second metal interconnections, and the time switch is configured as allowing the gap portion to turn into a conductive state so as to short-circuit the first and second metal interconnections to thereby isolate the circuit, when a predetermined time limit for operation has reached. In this configuration, the ID tag may further include an air-tight compartment housing the first and the second metal interconnections, and a start unit breaking the air-tightness of the air-tight compartment to thereby introduce the air or an oxidative gas into the compartment, allowing the start unit to activate the time switch.

The ID tag of the present invention may be configured as having a plurality of such time switches, so as to activate an arbitrary time switch.

According to the present invention, there is provided an ID tag which can automatically be nullified without artificial nullification.

According to the present invention, there is also provided an ID tag configured as being regenerable even after once nullified, and made recyclable in a style of keeping security and of keeping privacy hidden.

BRIEF DESCRIPTION OF THE DRAWINGS

The above and other objects, advantages and features of the present invention will be more apparent from the following description taken in conjunction with the accompanying drawings.

BEST MODES FOR CARRYING OUT THE INVENTION

Figure 1:
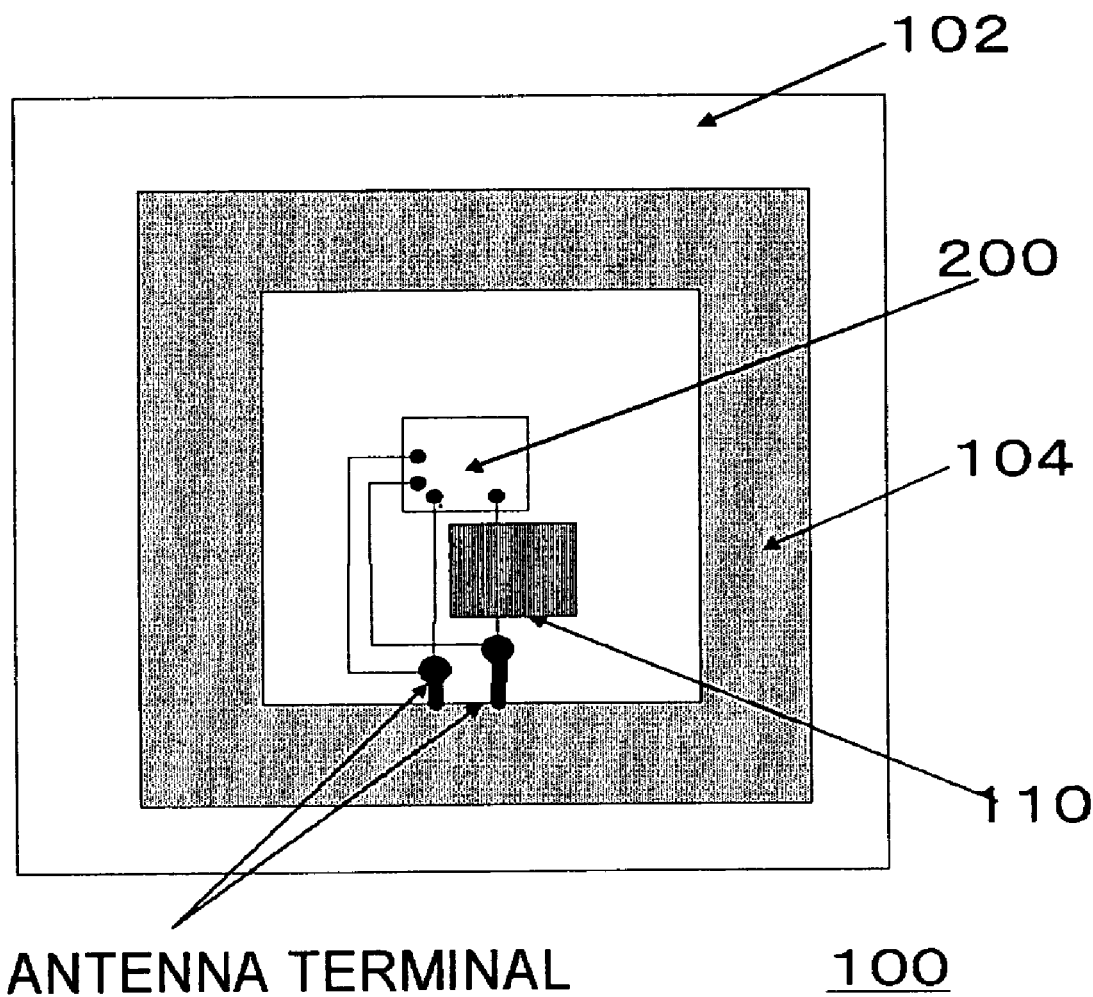
FIG. 1 is a schematic drawing of an ID tag according to an embodiment.

Paragraphs below will explain embodiments of the present invention referring to the attached drawings. It is to be noted that, in all drawings, any similar constituents are given with the same reference numerals, allowing omission of explanation for simplicity.

First Embodiment

First, a general configuration of an ID tag having a time switch according to the present invention will be explained. FIG. 1 is a drawing showing an internal structure of an exemplary RFID tag of this embodiment. The RFID tag 100 has a circuit including an antenna (coil antenna 104) and an IC chip 200, and a nullification unit (nullification mechanism 110) isolating the circuit. The nullification unit (nullification mechanism 110) includes a time switch isolating the circuit when a predetermined time limit for operation has reached after the start of use of the ID tag. A coil antenna 104, an IC chip 200 and a nullification mechanism 110 are provided on a substrate 102.

The IC chip 200 is a thin chip having a communication circuit which takes part in transmission of various data to or from an external reader/writer, and a memory storing various data incorporated therein. The coil antenna 104 applicable herein may be such as being formed by pattern-forming printing with an electro-conductive paste on an inlet substrate composed of paper or polyimide, or formed by etching.

The RFID tag is configured so as to allow the non-contact reader/writer to emit electric wave to thereby generate electromotive force in the coil antenna 104 based on the principle electromagnetic induction, and so as to use the electromotive force to activate the IC chip 200 connected to the coil antenna 104 to thereby enable writing and reading of various data based on electric wave communication. The explanation in the above described an exemplary case of using the coil antenna, and making use of electromagnetic induction in transmission of electric power and data. There are, however, various methods other than the above-described one, such as using, as the antenna, a resonator matched to wavelength at a frequency to be used, and thereby using electric wave for transmission of electric power and data.

Figure 2:
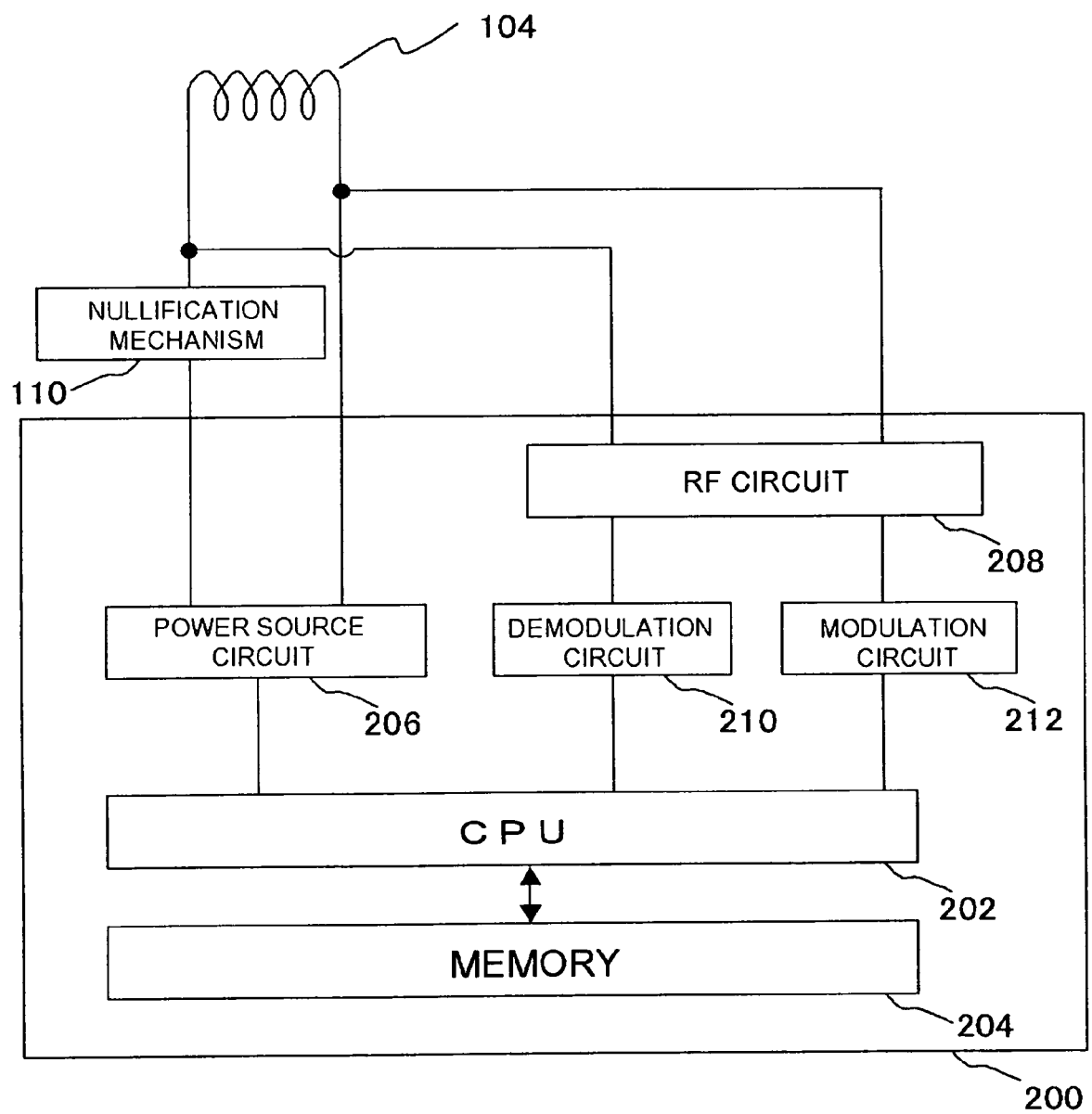
FIG. 2 is a drawing showing an internal configuration of an IC chip shown in FIG. 1.

FIG. 2 is a drawing showing an internal structure of the IC chip 200. The power source circuit 206 shown in the drawing incorporates capacitor not shown, and the capacitor forms a resonator circuit together with the coil antenna 104. The capacitor is charged, when the coil antenna 104 receives electric-wave of a specific frequency (frequency where the resonator circuit resonates), with electric power generated based on the mutual induction operation. The power source circuit 206 supplies the electric power to a CPU 202 after rectifying and stabilizing it, and thereby activates the IC chip 200. A memory 204 includes a ROM (read only memory), a RAM (random-access memory) and an EEPROM (electrically erasable programmable read only memory). The memory 204, under control of the CPU 202, reads the stored data corresponding to a read-out command based on data communication of a received electric wave, and writes the data corresponding to a write-in command of a received electric wave.

Paragraphs below will further detail operations of the IC chip 200 shown in FIG. 2.

When the coil antenna 104 receives an RF signal from the external, the capacitor of the power source circuit 206 is charged with electric power generated based on the mutual induction operation between the coil antenna 104 and an antenna (not shown) of an external device. As a consequence, the power source circuit 206 rectifies and stabilizes the electric power, supplies it to the CPU 202, to thereby activate the IC chip 200. Next, an RF circuit 208 of the IC chip 200 fetches only a signal necessary for demodulation, allows a demodulation circuit 210 to regenerate a digital signal of a predetermined information, and the CPU 202 writes the digital signal into the memory 204.

Data transmission from the RFID tag 100 to the external corresponding to the received signal is processed according to the procedures described below. That is, when the coil antenna 104 receives an RF signal from the external, the capacitor of the power source circuit 206 is charged with electric power. The power source circuit 206 supplies the electric power to the CPU 202 to thereby activates the IC chip 200, and allows the demodulation circuit 210 to regenerate the original digital signal via the RF circuit 208. The CPU 202 sends a predetermined information stored in the memory 204, based on the signal. According to the information, the binarized data signal is modulated by the modulation circuit 212 of the IC chip 200, amplified by the RF circuit 208, and sent from the coil antenna 104 to the external.

The nullification mechanism 110 is disposed between the coil antenna 104 and the power source circuit 206, as shown in FIG. 2. The nullification mechanism 110 includes a time switch which isolates the circuit when a predetermined time limit for operation has reached after being activated by a predetermined start unit. The time switch nullifies the RFID tag 100 when a preset duration of time of use or number of times of use is reached, and executes a process of forbidding read/write of the data. The nullification mechanism 110 has a time nullification function with the aid of such time switch. When the nullification is executed, a signal received by the coil antenna 104 is forbidden to reach the power source circuit 206, and thereby the RFID tag 100 is disabled.

As has been described above in the background art, the conventional nullification mechanism could execute the nullification with the aid of predetermined operations by human, such as activating or heating a fuse. In contrast to this, the nullification mechanism 110 in this embodiment can automatically be nullified without needing human assistance, so that it is made possible to prevent the nullification from being forgotten.

Figure 3:
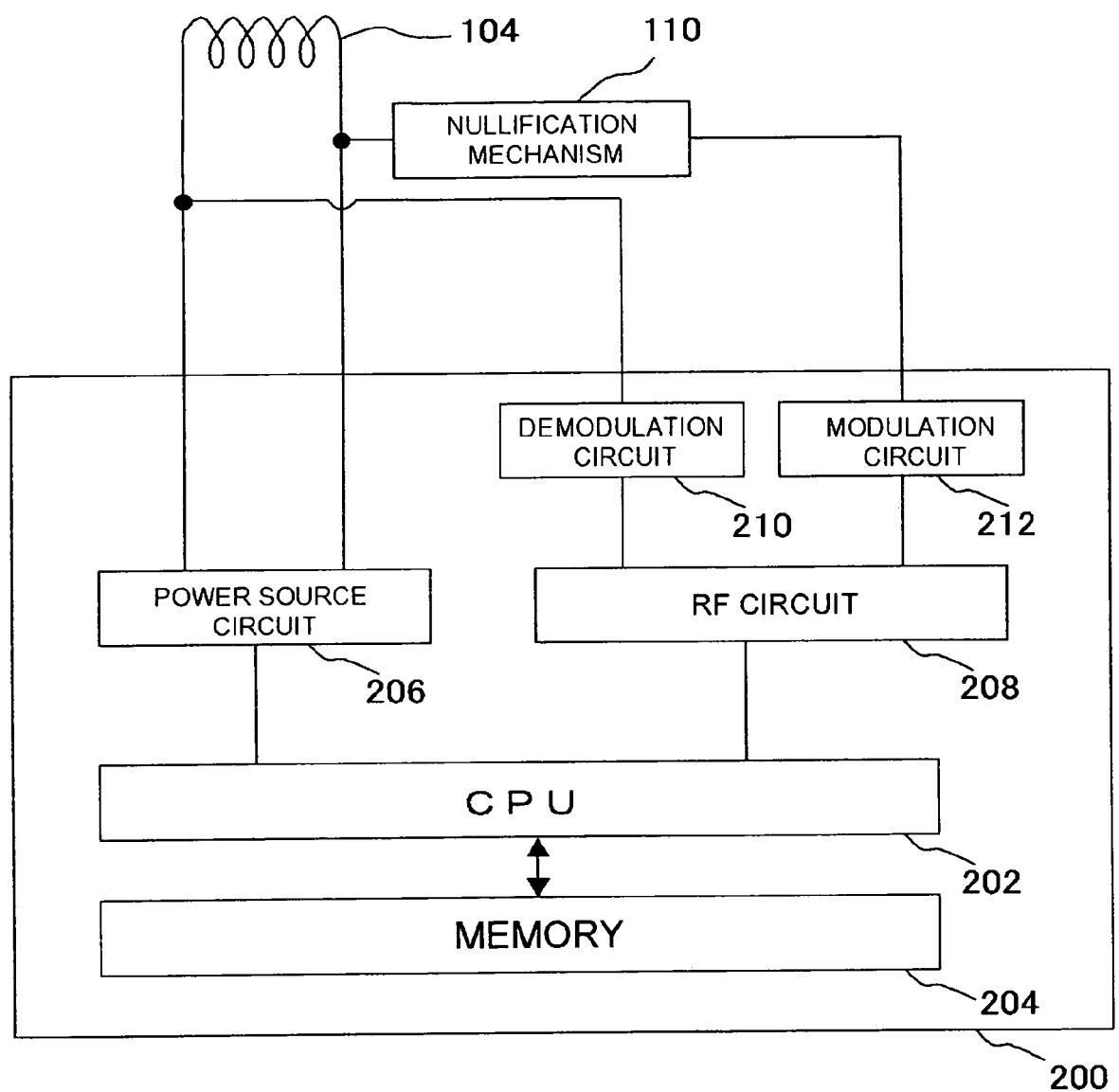
FIG. 3 is a schematic drawing of an ID tag according to an embodiment.

It is to be noted herein that the location of placement of the nullification mechanism 110 is not limited to the above-described one, allowing adoption of various modes of embodiments. It is also allowable to forbid transmission to and from the RFID tag, or only reception, or only sending. It is still also allowable, as shown in FIG. 3, to provide it between the coil antenna 104 and the modulation circuit 212. In this case, the execution of the nullification forbids sending of a signal from the modulation circuit 212 to the coil antenna 104. As a consequence, sending of any signal from the RFID tag 100 to the external is prohibited, although reception of the signal remains enabled.

Second Embodiment

In this embodiment, an exemplary time switch included in the nullification mechanism 110 will be explained.

(General Structure)

Figure 4:
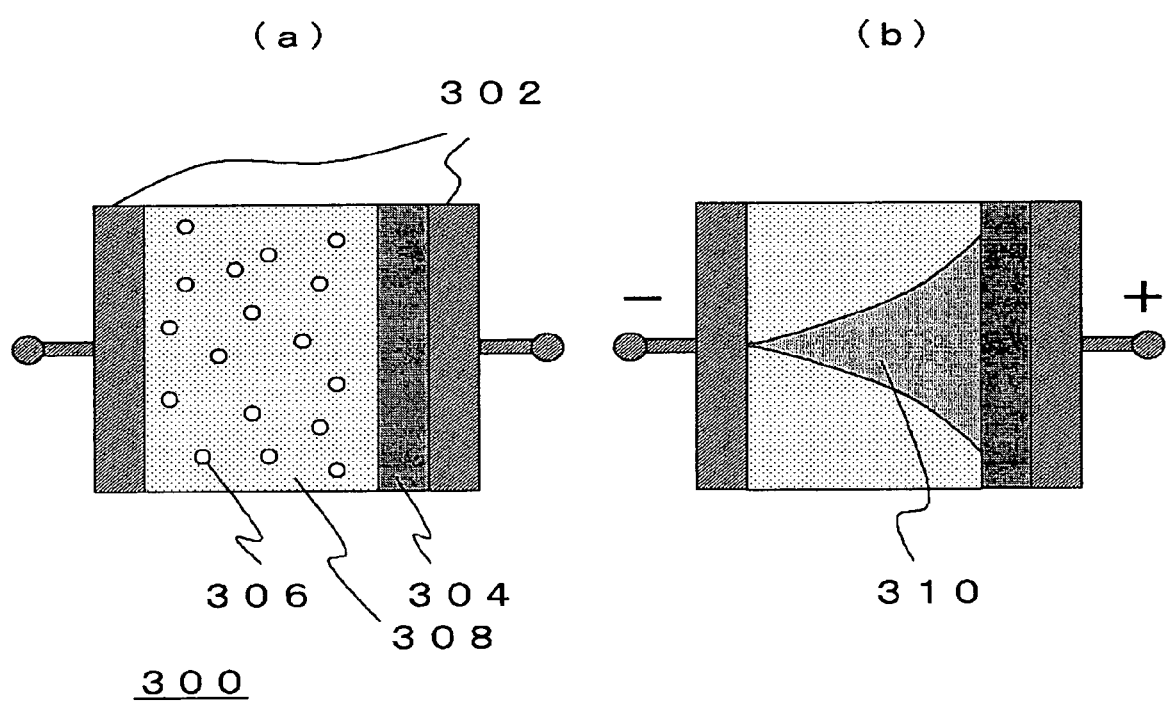
FIG. 4 is a schematic drawing showing one exemplary configuration of a time switch.

FIG. 4 is a drawing showing a general configuration of a solid electrolyte switch 300 as an example of the time switch according to the present invention. The switch makes use of a phenomenon such that a conduction channel formed in the solid electrolyte film in the initial state thereof disappears with time.

FIG. 4(a) is a drawing schematically showing a state of the solid electrolyte switch 300 in the switched-off state. As shown in the drawing, the solid electrolyte switch 300 has a pair of electrodes 302 opposed with each other, and a solid electrolyte 308 held therebetween. An ion supplying layer 304 is provided on the inner surface of one of the electrodes 302. Metal ions 306 released from the ion supplying layer 304 reside in the solid electrolyte 308 in a distributed manner. In an equilibrium state, there is no electro-conductivity between the electrodes, and the turned-off state is established.

FIG. 4(b) is a drawing schematically showing the solid electrolyte switch 300 in the switched-on state. In contrast to the state of the solid electrolyte switch 300 shown in FIG. 4(a), when a predetermined voltage is applied between the electrodes 302, the metal ions deposit in the solid electrolyte 308 to thereby form a conduction channel 310. As a consequence, the solid electrolyte switch 300 is brought into the turned-on state. Because the deposition mechanism is reversible, application of reverse voltage between the electrodes of the solid electrolyte switch 300 already turned on makes the deposited metal atoms to migrate in the solid electrolyte to thereby thin the conduction channel 300, so that the channel finally disappears, and the solid electrolyte switch 300 is turned into the non-conductive state. Use of this switch successfully realizes an IC tag which can automatically be nullified without artificial nullification.

Figure 5:
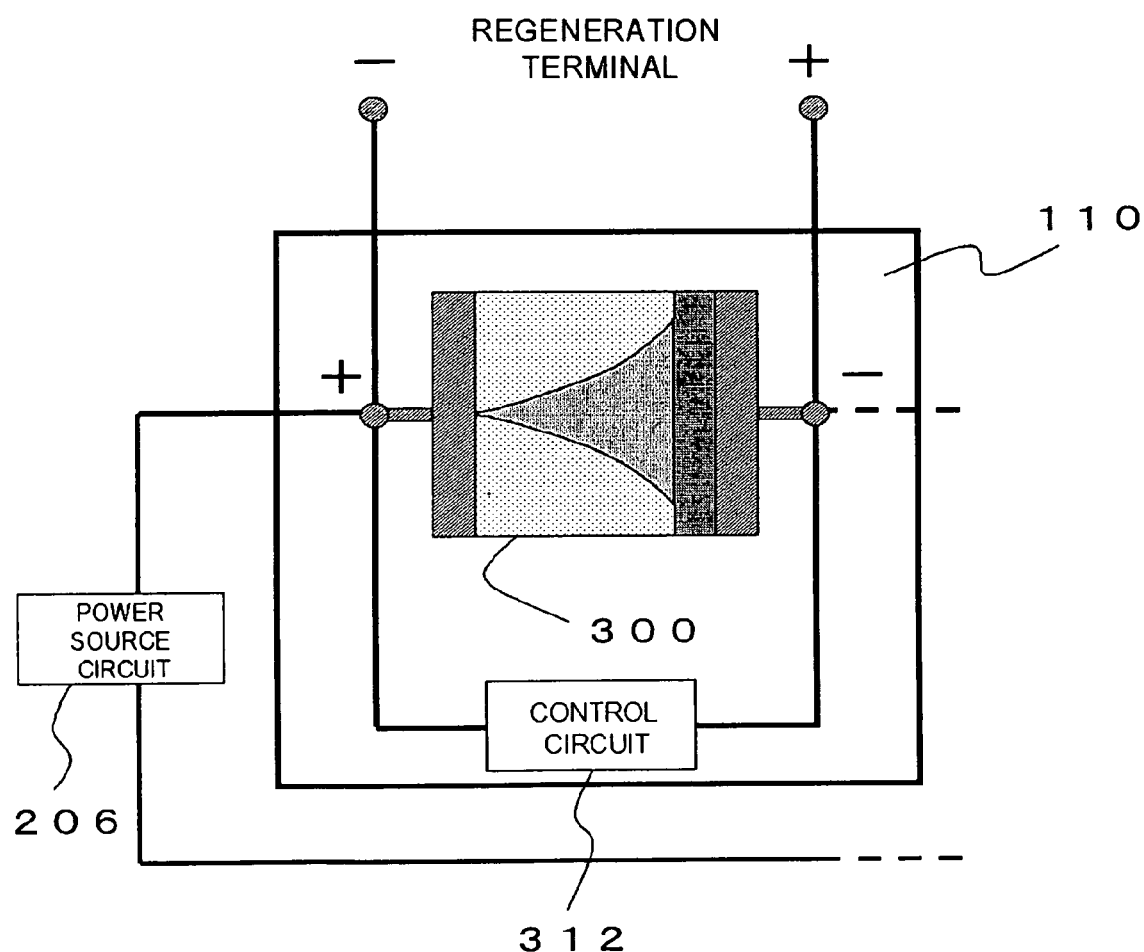
FIG. 5 is a schematic drawing showing a state of use of a solid electrolyte switch shown in FIG. 4.

FIG. 5 is a schematic drawing showing a state of use of a passive-type RFID having the solid electrolyte switch 300 shown in FIG. 4 incorporated therein. First, by applying a predetermined voltage to the solid electrolyte switch 300, the metal atoms are allowed to deposit to thereby form the conduction channel. The solid electrolyte switch 300 is then connected to a power source in a direction allowing the power source voltage to be applied so as to turn off the conduction channel in the state of use of the RFID tag.

When the RFID operates upon reception of electric wave from the external, the conduction channel gradually thins. In this case, an element which can be turned off after being used a specific number of times is realized, by designing and fabricating the solid electrolyte switch 300 so as to obtain desired voltage-current characteristics based on appropriate selection. The switch can be regenerated by applying voltage through a regeneration terminal in the direction reverse to that during the use, so as to reform the conduction channel in the solid electrolyte film, to thereby return the switch into the turned-on state. The regeneration terminal herein has also a function as a short-circuiting terminal, and can nullify the function of the nullification switch through short-circuiting between the terminals.

It is also made possible to further improve the accuracy of specifying the number of times of use, by adding a counter or a DC-DC converter to the peripheral portion, and to absorb difference between the source voltage required by the RFID and voltage nominally required by the solid electrolyte switch 300 for its operation. Another possible configuration is such as using a fuse, allowing the nullification switch to activate when the fuse is blown.

Figure 17:
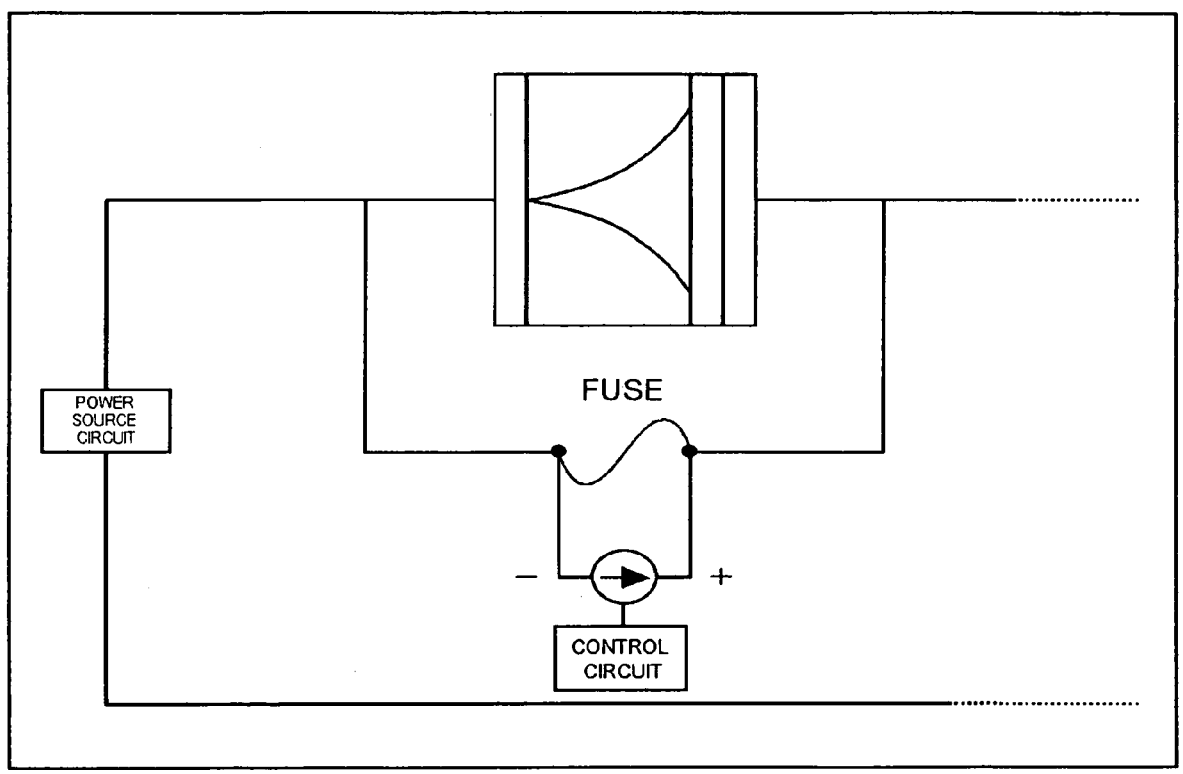
FIG. 17 is a drawing showing an exemplary nullification switch combined with a fuse.

FIG. 17 is a drawing showing one example of such configuration. In the illustrated structure having a fuse connected therein, current from the power source circuit flows through the fuse. When the nullification switch is desired to be made effective, a signal is first sent out from a control circuit to thereby activate the current source. The current for blowing the fuse output from the current source principally flows through the fuse so as to blow it. For the case where the current is a direct current, the current is distributed into the fuse and the electrolyte switch depending on the resistivity values thereof, so that the resistivity value of the fuse is set smaller enough than the resistivity value of the electrolyte switch. For another exemplary case where the current is pulsive, also inductance is contributive, so that the inductance of the fuse is set small enough. Upon blowing of the fuse, the current from the power source circuit flows only through the electrolyte switch, and makes nullification mechanism effective.

(Compositional Materials)

Figure 6:
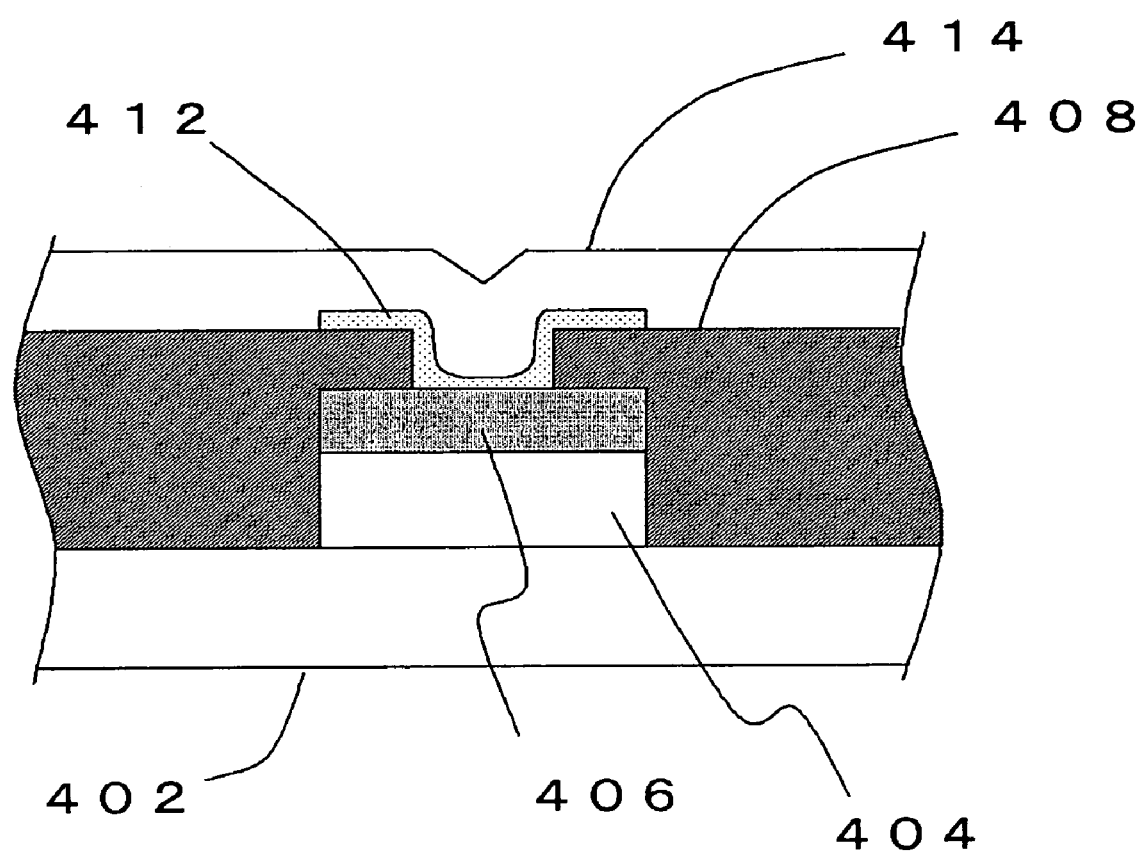
FIG. 6 is a drawing showing an exemplary specific configuration of the solid electrolyte switch.

Examples of materials composing the solid electrolyte switch 300 will be explained. FIG. 6 is a drawing showing an example of specific configuration of the solid electrolyte switch 300.

The solid electrolyte switch 300 includes a first electrode (lower interconnection 404) and a second electrode (upper interconnection 414) provided in the circuit in parallel with each other, as being spaced by a predetermined distance, and a solid electrolyte film (solid electrolyte layer 406) held between these electrodes, and further has a metal ion supplying section (upper region of the lower interconnection 404) in contact with the solid electrolyte film (solid electrolyte layer 406). The peripheral region of the lower interconnection 404 and the solid electrolyte layer 406 is buried by an interlayer insulating film 408.

In the drawing, the solid electrolyte layer 406 corresponds to the solid electrolyte 308 shown in FIG. 4. The solid electrolyte layer 406 is introduced with the ions released from the lower interconnection 404, so that the solid electrolyte layer 406 forms therein a conduction channel composed of ion crosslinked structure under application of a predetermined voltage. Sustained application of an electric field in the direction reverse to that in the channel formation, while keeping the conduction channel thus formed, gradually narrows the channel width, and the channel disappears after the elapse of a predetermined length of time, and turns into the non-conductive state.

A composite conductor allowing both of ions and electrons to conduct therethrough is used as a material for composing the solid electrolyte layer 406, and a metal chalcogenide is preferably used for composing the solid electrolyte layer 406. The metal chalcogenide is exemplified by:

metal sulfides such as copper sulfide and silver sulfide;

metal selenides such as copper selenide and silver selenide; and metal telluride such as copper telluride and silver tellurde. Species of the metal may be those other than copper and silver, allowing use of PbTe (lead telluride), SnTe (tin telluride), GeSe (germanium selenide), for example.

A metal sulfide, which is typically copper sulfide, is used in this embodiment. The lower interconnection 404 is composed of a metal same as the metal ions in the solid electrolyte layer 406, and plays a role of an ion supplying layer. Upon being applied with a predetermined voltage, the lower interconnection 404 supplies the metal ions to the solid electrolyte layer 406, and under application of the reverse voltage, metal ions are supplied from the solid electrolyte layer 406 towards the lower interconnection 404 side.

The thickness of the solid electrolyte layer 406 is designed to have an appropriate value, depending on the compositional material and length of time limit for operation. For the case using copper sulfide, the thickness of the solid electrolyte layer 406 is preferably adjusted to 2 nm to 200 nm in general.

The lower interconnection 404 and the upper interconnection 414 are preferably formed using a low resistivity film such as those composed of copper, aluminum and the like. The thickness may be adjusted to 20 nm to 1000 nm or around. Possible combinations of the solid electrolyte layer 406 and the interconnection 404 other than the above-described copper sulfide and copper include chromium sulfide and chromium, silver sulfide and silver, titanium sulfide and titanium, tungsten sulfide and tungsten, nickel sulfide and nickel, and so forth.

The upper region of the lower interconnection 404 functions as a metal ion supplying section. The metal ion supplying section is preferably such as supplying a metal same as the metal composing metal chalcogenide.

The upper electrode 412 is preferably formed using a material less likely to cause chemical reaction with the solid electrolyte layer 406. Examples of such material include titanium. Besides titanium, it is also allowable to use precious metals such as platinum, gold and so forth, the Group VI metals in the periodic table such as chromium, tungsten, molybdenum and so forth, metals such as vanadium, niobium, tantalum and so forth, and nitrides, and silicides thereof and so forth.

(Method of Fabrication)

Figure 7:
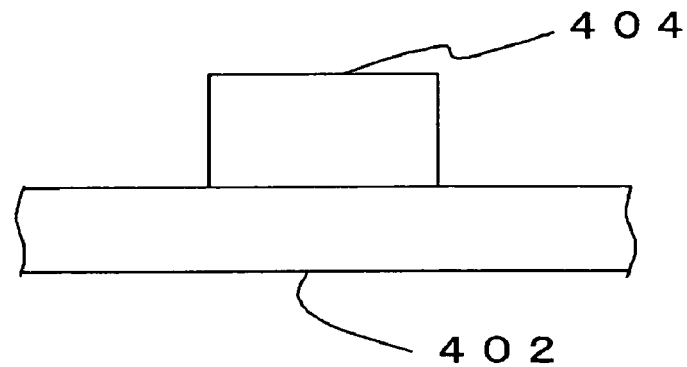
FIG. 7 is a drawing explaining a method of fabricating the solid electrolyte switch shown in FIG. 6.
Figure 7:
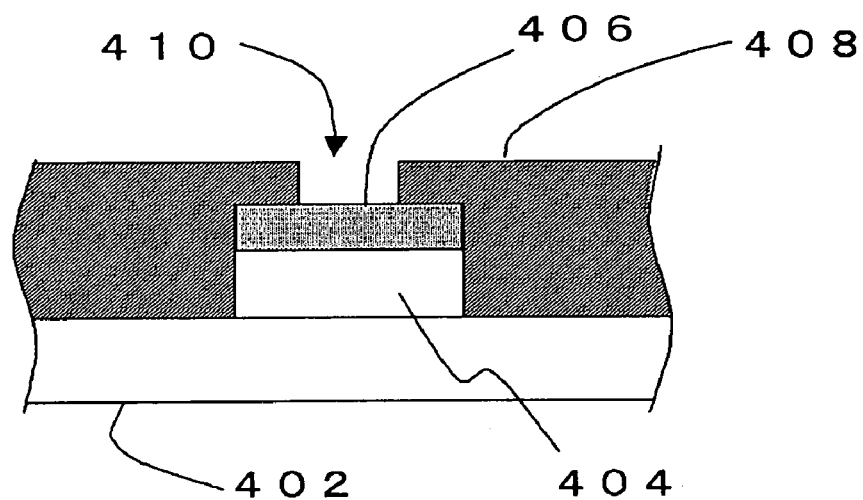
Figure 7:
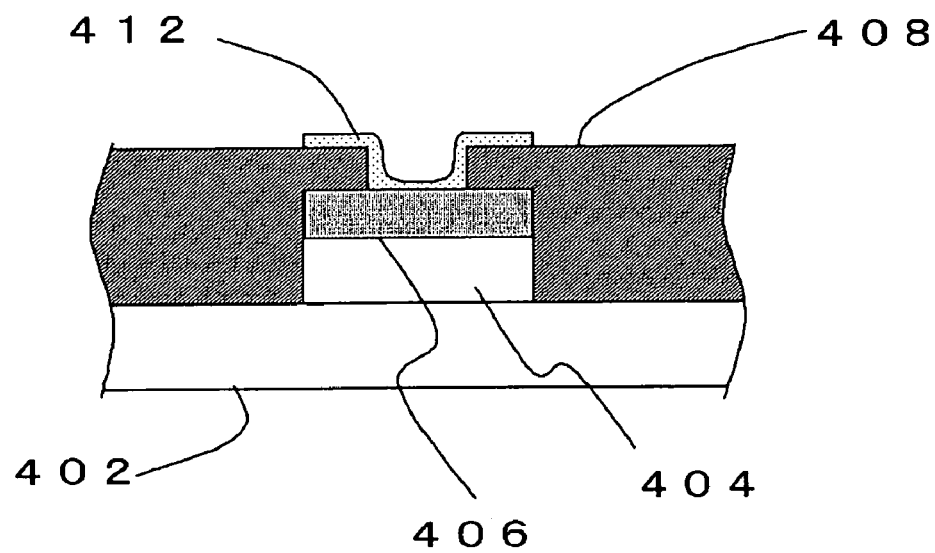

FIG. 7 is a drawing showing a method of fabricating the solid electrolyte switch 300 shown in FIG. 6. First, as shown in FIG. 7(a), a substrate 402 is fabricated by oxidizing a silicon substrate, and thereon a copper film is formed. The copper film can be formed typically by using the vacuum evaporation process or sputtering process.

Next, an excessive portion of the copper film, other than the portion to be remained as the lower interconnection 404, is etched by wet etching or dry etching so as to obtain an interconnection geometry, to thereby obtain the lower interconnection 404.

Next, as shown in FIG. 7(b), the interlayer insulating film 408 is formed. For example, a silicon nitride film or a silicon oxide film is formed as the interlayer insulating film 408 by the sputtering process, the CVD process or the like. After formation of the interlayer insulating film 408, the interlayer insulating film 408 is selectively removed by dry etching or wet etching process, to thereby form a viahole 410. In view of shortening the signal delay and of reducing parasitic capacitance, a low-k film typically having a dielectric constant of 3 or smaller may be used as a material composing the interlayer insulating film 408. For example, MSQ (methyl silsesquioxane), SiOC film and so forth may be used. The thickness of the interlayer insulating film 408 may be 50 to 1000 nm, for example.

Next, copper exposed in the viahole 410 is sulfurized. Sulfurization of copper is effected by anode polarization in an aqueous solution containing a sulfide. The anode polarization is proceeded in an aqueous solution containing 0.05 mol/L of sodium sulfide, using the copper film as an anode. Voltage applied thereto is 0.5 V or around, and degree of sulfurization is adjusted by controlling current. The sulfurization is stopped when the surficial layer of the copper film is sulfurized to a desired thickness. For example, the reaction is terminated when the copper film is sulfurized to as deep as 1 nm to 100 nm from the surficial layer. The portion converted into copper sulfide by the sulfurization serves as the solid electrolyte layer 406, and the portion of copper remained as being not sulfirized serves as the lower interconnection 404. The degree of sulfurization can be monitored in situ by measuring electric conductivity of the copper film, and this makes it possible to control the thickness of sulfurization of the copper film. The solid electrolyte layer 406 composed of copper sulfide formed as described in the above corresponds to the ion supplying layer 304 shown in FIG. 4.

In this embodiment, fabrication of the ion supplying layer was omitted because copper, which is a metal composing the solid electrolyte, was used as a material composing the lower interconnection 404, whereas the ion supplying layer may also be formed by depositing a metal layer or a metal sulfide layer independent of the interconnection.

The thickness of the solid electrolyte layer 406 may be approximately 2 nm to 200 nm when copper sulfide as a composite electro-conductor was used therefor. The thickness of the lower interconnection 404 composed of copper may be approximately 20 nm to 300 nm.

For the case where the lower interconnection 404 is composed of a material other than copper, it is preferable to provide the ion supplying layer. The ion supplying layer is disposed on the inner surface of one of the opposed pair of electrodes. The thickness of the ion supplying layer, when composed of copper, may be approximately 2 nm to 50 nm.

The thickness of the upper interconnection 414 may be approximately 20 nm to 300 nm.

Next, as shown in FIG. 7(c), the upper electrode 412 is formed using titanium. In this embodiment, titanium was deposited by the vacuum evaporation process. The thickness of the upper electrode 412 is adjusted to 5 nm to 30 nm.

Finally as shown in FIG. 6, copper composing the upper interconnection is stacked on the interlayer insulating film 408 typically by the sputtering process. Next, the upper interconnection 414 is formed by dry etching through a resist mask opened outside the area for forming the upper interconnection. In this embodiment, the thickness of the upper interconnection 414 may be approximately 20 nm to 300 nm.

The lower interconnection 404 and the upper interconnection 414 may be composed of any conventionally-used interconnection material, other than the above-described copper, wherein aluminum, gold and so forth may be used.

The solid electrolyte switching element of the present invention is fabricated as described in the above, wherein copper sulfide which is a composite electric conductor is suitable for forming the solid electrolyte layer 406. Copper sulfide shows conversion at 220° C. from copper (II) sulfide to more stable copper (I) sulfide. Copper (I) sulfide has a melting point of 1130° C., has a good heat stability, and has been confirmed as showing no changes in the characteristics as the solid electrolyte switch even after being heated at 300° C. for 1 hour.

(Electrical Characteristics)

Figure 8:
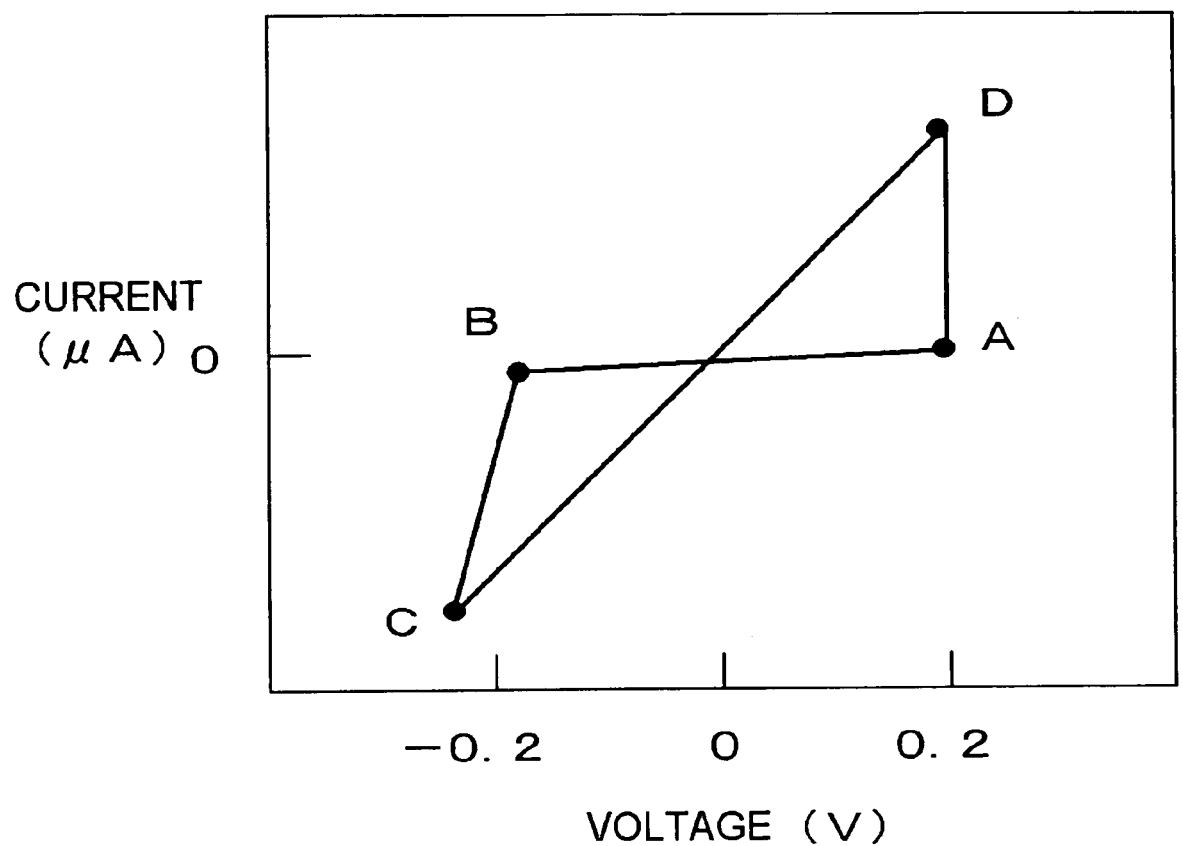
FIG. 8 is a drawing explaining operations of the solid electrolyte switch shown in FIG. 6.

FIG. 8 is a drawing explaining electrical characteristics of the solid electrolyte switch 300 explained referring to FIG. 4 to FIG. 7. Voltage applied between both ends of the solid electrolyte switch 300 while being changed as 0.2 V→0 V→−0.18 V→−0.23 V→0 V→0.2 V gives a profile routed as A→B→C→D. Between points A→B, the solid electrolyte switch 300 corresponds to the state shown in FIG. 4(a), wherein current hardly flows between the electrodes. At point B, the conduction channel 310 explained in FIG. 4(b) starts to be formed. When the voltage is increased in the minus direction from point B to point C, the channel is widened, and thereby current distinctively increases. Between points C→D, current flows through thus-formed channel proportional to the applied voltage. Between points D-A, the channel becomes thinner, and thereby level of current sharply decreases.

Conductance between both ends of the solid electrolyte switch 300 thus largely varies, by changing the level or polarity of applied voltage.

(Time Nullification Function)

Figure 9:
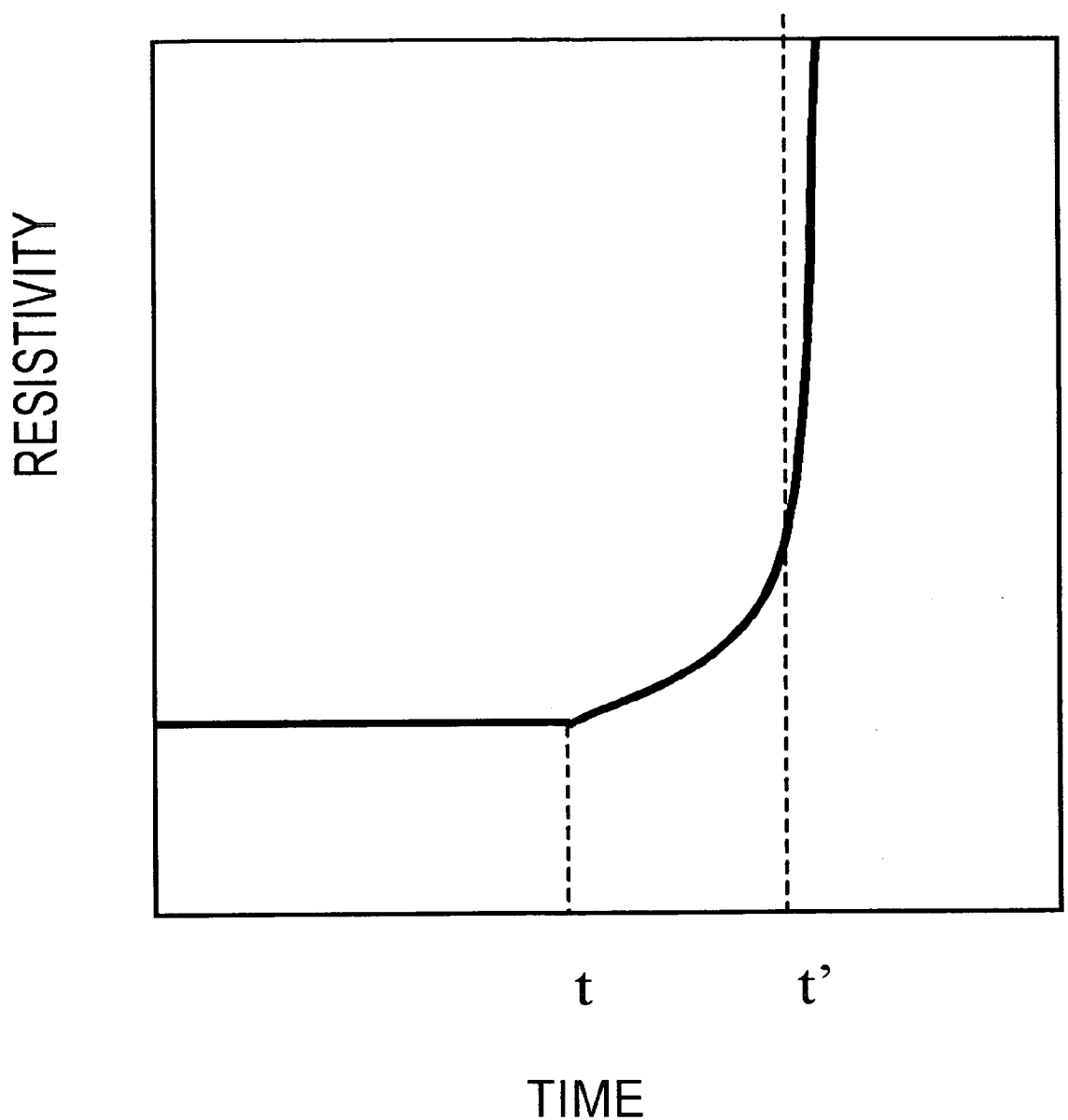
FIG. 9 is a drawing explaining functions of the solid electrolyte switch shown in FIG. 6.

The solid electrolyte switch 300 applied with voltage at point C in FIG. 8 results in formation of the conduction channel as shown in FIG. 4(b). Disconnection from the power source in this state allows the conduction channel to remain unchanged. If the RFID tag 100 is used in this state, while being applied with voltage reverse to at point C in FIG. 8, the conduction channel gradually narrows, and disappears after elapse of a predetermined length of time, or after being used a predetermined number of times. FIG. 9 is a drawing showing a pattern of change in the internal resistance of the solid electrolyte switch 300 with time. The resistivity value is kept almost constant until a predetermined time t is reached, but beyond time t, the resistivity stepwise increases, and drastically increases when time t' is reached, no more allowing the current to flow through the solid electrolyte switch 300. Time t' depends on an internal configuration of the solid electrolyte switch 300, and more specifically, compositional material, thickness, ion concentration of the solid electrolyte layer 410 and so forth. By adjusting these parameters, an element which turns into non-conductive after reaching a predetermined length of time of use, and has a function of nullifying the RFID tag is provided.

According to this embodiment, an ID tag which can automatically be nullified without artificial nullification, and can protect secret information stored therein is realized.

Third Embodiment

Figure 10:
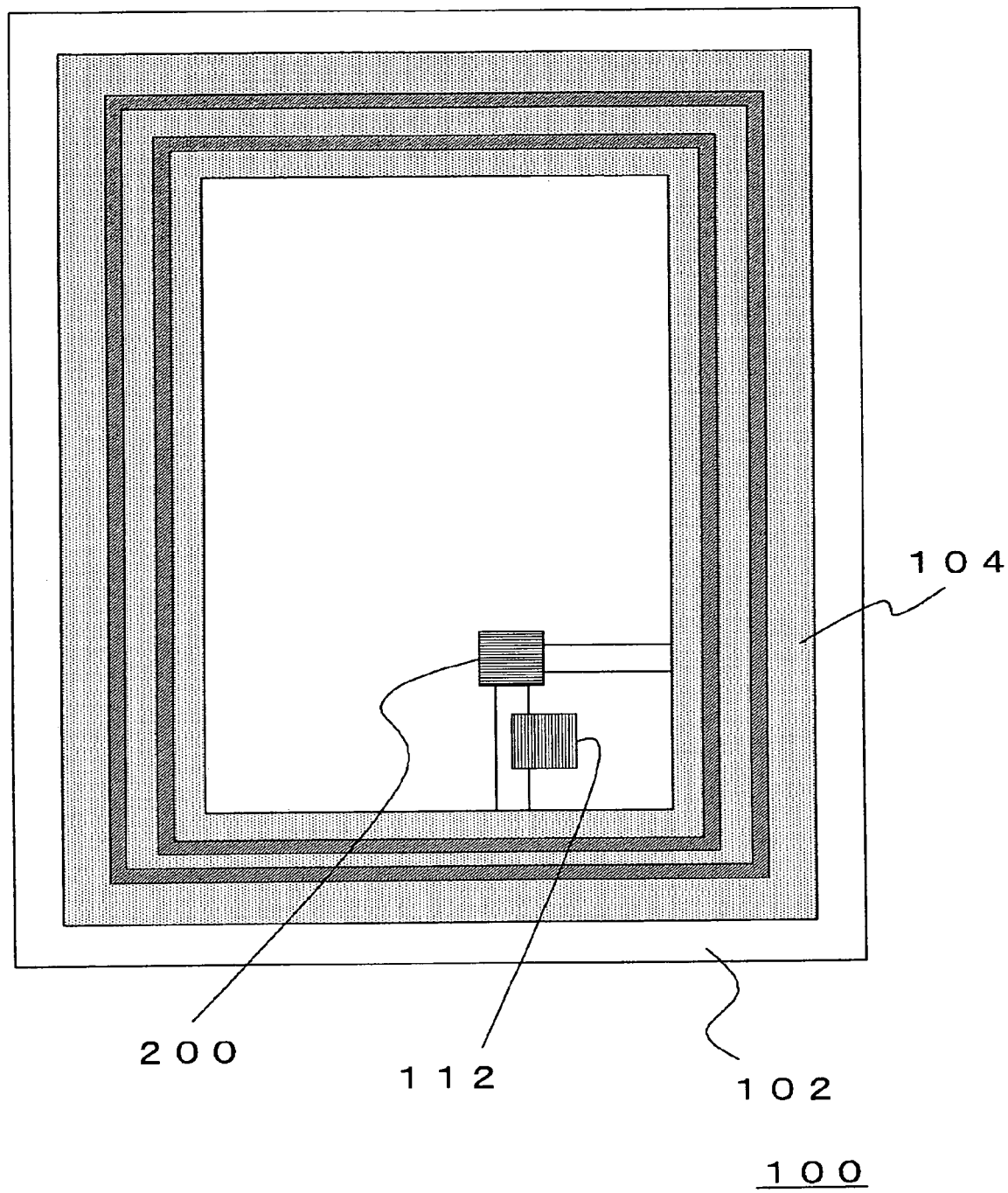
FIG. 10 is a schematic drawing of an ID tag according to an embodiment.

This embodiment shows an example of a narrow metal line composed of a metal or a semiconductor, which can be converted into an insulating material through oxidation, applied to the time nullification switch. FIG. 10 is a schematic drawing of the RFID tag of this embodiment.

The RFID tag 100 has the circuit including the antenna (coil antenna 104) and the IC chip 200, and the nullification unit (time switch 112) isolating the circuit. The nullification unit (time switch 112) isolates the circuit when a predetermined time limit for operation has reached after the start of use of the ID tag. The coil antenna 104, the IC chip 200 and the nullification mechanism 110 are provided on the substrate 102.

The IC chip 200 is a thin chip having a communication circuit which takes part in transmission of various data to or from an external reader/writer, and a memory storing various data incorporated therein. The coil antenna 104 applicable herein may be such as being formed by pattern-forming printing with an electro-conductive paste on an inlet substrate composed of paper or polyimide, or formed by etching.

The time switch 112 uses a narrow metal line as the time switch. The narrow metal line is oxidized with time, and entire portion of which becomes an insulating material and is made non-conductive, after a predetermined point of time has reached. The length of time required for making it non-conductive is determined based on a compositional material, thickness, length and so forth of the narrow metal line.

Figure 11:
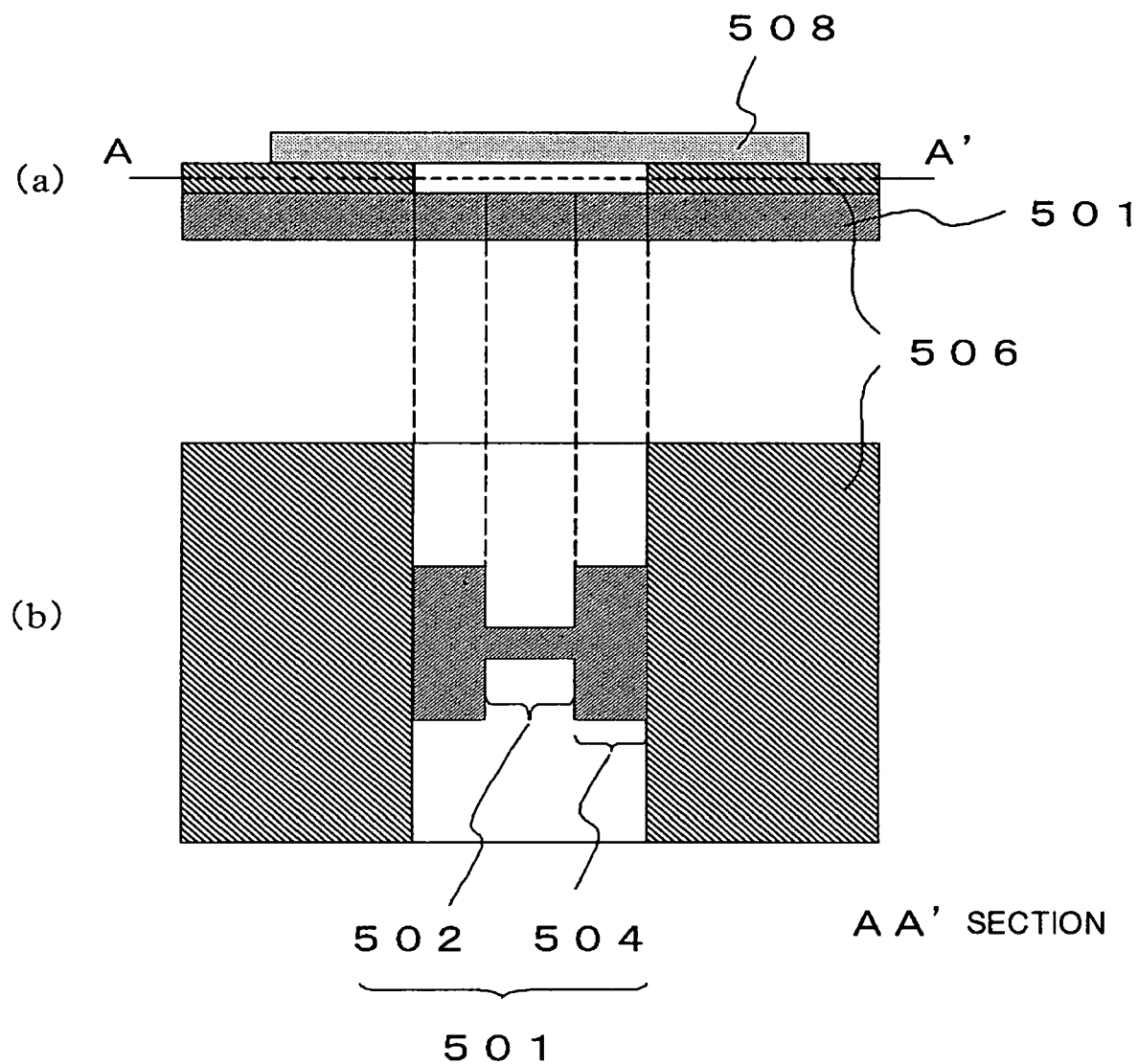
FIG. 11 is a drawing showing an exemplary specific configuration of the time switch.

FIG. 11 shows an exemplary specific configuration of the time switch 112 shown in FIG. 10. The configuration illustrated herein includes a metal line 501 composed of a narrow portion 502 (narrow metal line) and a wide portion 504, a protection film 506, and a seal material 508 stacked thereon.

Figure 12:
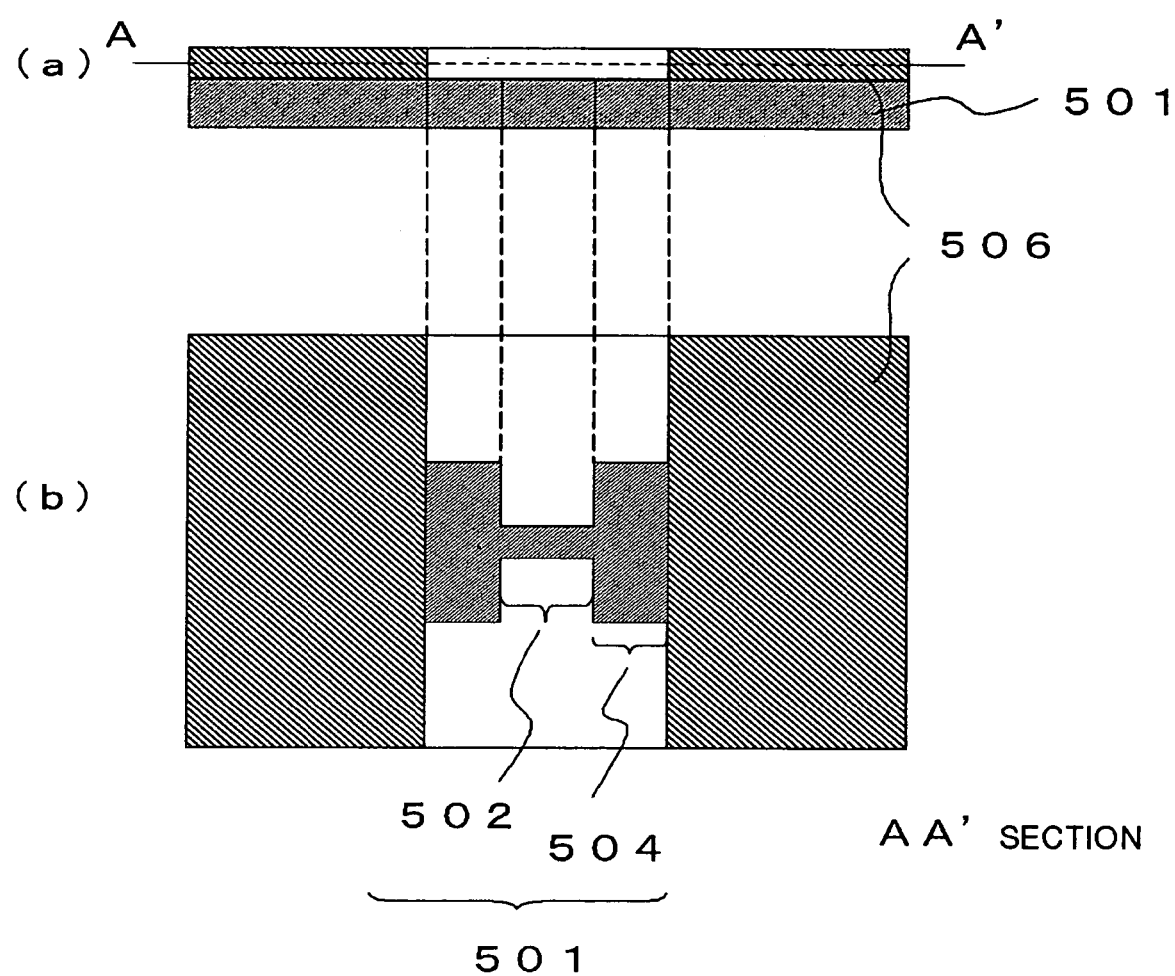
FIG. 12 is a drawing showing a state after start of use of the time switch shown in FIG. 10.

The protection film 506 is opened over the narrow portion 502 and a part of the wide portion 504 adjacent thereto, and the opened portion is sealed with the seal material 508. A space formed by the metal line 501, the protection film 506 and the seal material 508 is filled with an inert gas. The seal material 508 is peeled off at the beginning of use of the RFID tag provided with the time switch 112, so as to allow the surface of the narrow portion 502 to expose to the air (FIG. 12). The narrow portion 502 is then oxidized by the atmospheric oxygen, and gradually narrows the conduction path in the narrow portion 502 as the oxidation proceeds. The sectional area of the conduction path is sharply narrowed when a predetermined length of time has elapsed, and is made non-conductive. At this time, sending of a signal from the coil antenna 104 to the IC chip 200, shown in FIG. 10, is inhibited, and the function of the RFID tag 100 is nullified.

The width of the narrow portion 502 (narrow metal line) may typically be adjusted to 0.5 nm to 1 μm, and preferably 1 to 500 nm. Such adjustment preferably realizes a switch which turns into non-conductive through oxidation with time. A method of forming the narrow portion 502 (narrow metal line) can appropriately be selected depending on a metal material to be used. For an exemplary case where copper is used, the narrow portion 502 can be formed by dry etching, or by the damascene process generally adopted in silicon semiconductor process. For another exemplary case where aluminum or its alloy is used, it can be formed by a process such as dry etching.

Figure 13:
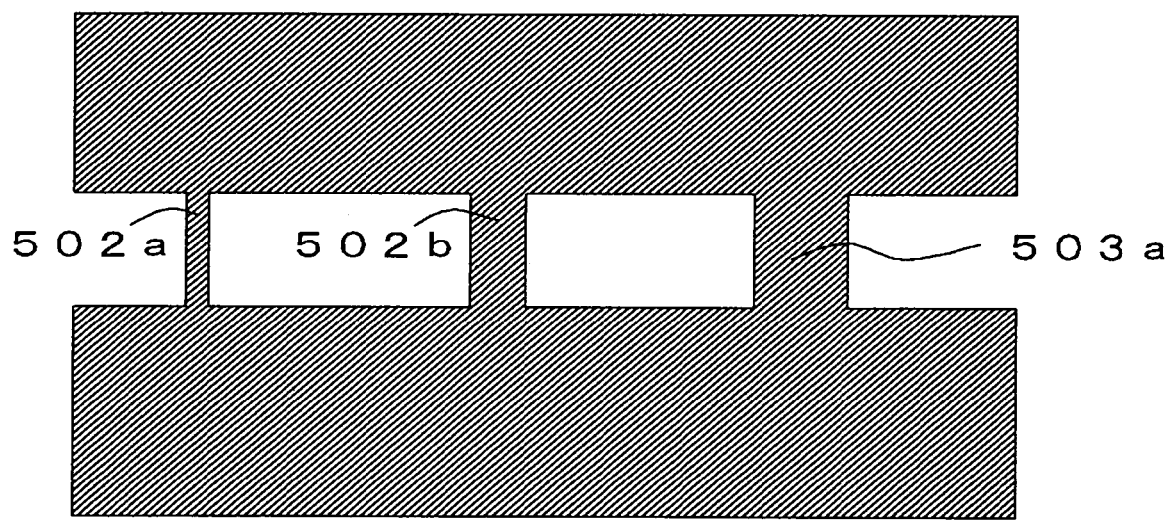
FIG. 13 is a drawing showing an exemplary specific configuration of the time switch.

The time switch 112 may also be configured as having a plurality of narrow metal lines differed in the width from each other. FIG. 13 is a schematic drawing of the time switch 112 having such plurality of narrow metal lines. The time switch 112 has narrow metal lines (narrow portion 502a, narrow portion 502b and narrow portion 503a) differed in the width from each other. Each of the narrow metal lines is independently sealed with a separate seal material, so that removal of either one of the seal materials triggers oxidation of the narrow metal line and allows the time nullification function to activate. This configuration makes it possible to adjust the time elapsed before being nullified at the user's wish. As a consequence, a single RFID tag can be adaptable to various applications.

Fourth Embodiment

This embodiment will explain a case having a narrow gap formed by two narrow metal lines likely to cause electromigration, and using this as the time switch.

Figure 14:
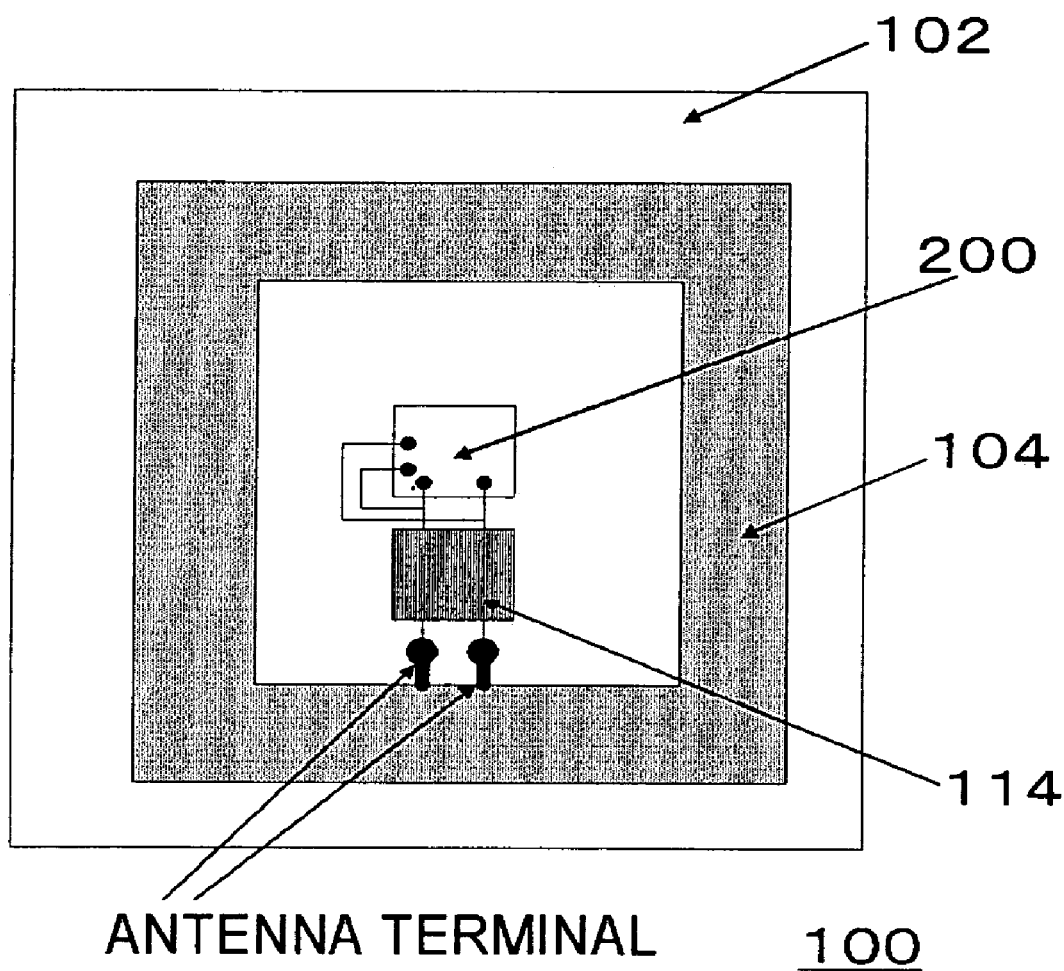
FIG. 14 is a schematic drawing of an ID tag according to an embodiment.

FIG. 14 is a schematic drawing of the RFID tag of this embodiment. The RFID tag 100 has the circuit including the antenna (coil antenna 104) and the IC chip 200, and the nullification unit (nullification mechanism 114) isolating the circuit. The nullification unit (nullification mechanism 114) includes a time switch isolating the circuit when a predetermined time limit for operation has reached after the start of use of the ID tag. The coil antenna 104, the IC chip 200 and the nullification mechanism 114 are provided on the substrate 102. The IC chip 200 is a thin chip having a communication circuit which takes part in transmission of various data to or from an external reader/writer, and a memory storing various data incorporated therein. The coil antenna 104 applicable herein may be such as being formed by pattern-forming printing with an electro-conductive paste on an inlet substrate composed of paper or polyimide, or formed by etching.

The nullification mechanism 114 uses a narrow gap formed by two narrow metal lines as the time switch. The ID tag is nullified by the gap portion turned into conductive when a predetermined point of time has reached.

Figure 15:
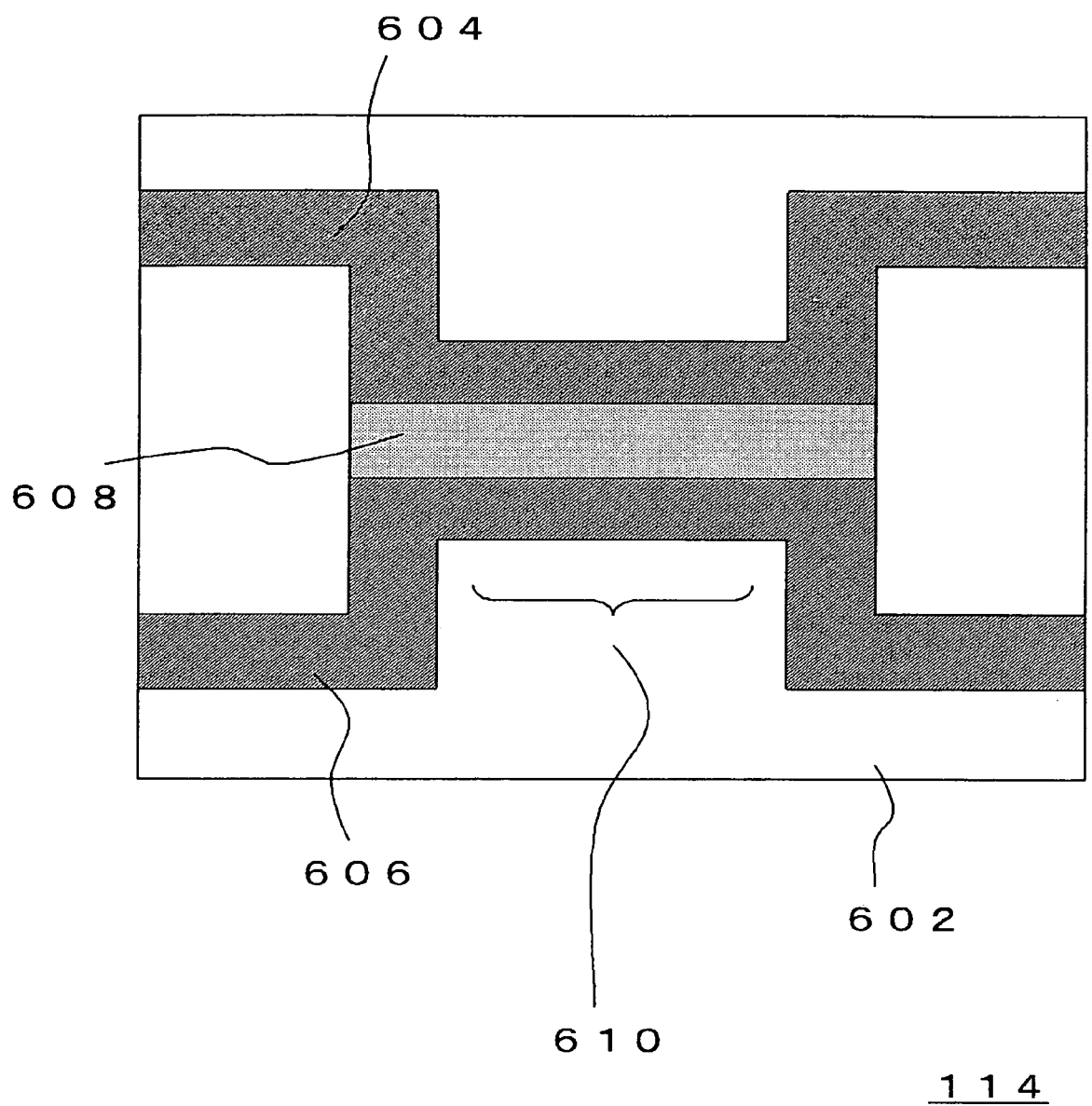
FIG. 15 is a drawing showing an exemplary specific configuration of the time switch.

FIG. 15 shows an exemplary specific configuration of the nullification mechanism 114 shown in FIG. 14. The nullification mechanism 114 illustrated herein has a configuration including a first interconnection 604, a second interconnection 606 and a gap 608 held therebetween, as being provided on a substrate 602. The left ends of the first interconnection 604 and the second interconnection 606 are connected to the coil antenna 104 as shown in FIG. 14. On the other hand, the right ends of the first interconnection 604 and the second interconnection 606 are connected to the IC chip 200 as shown in FIG. 14. When the IC chip 200 receives a signal from the external, a predetermined level of current flows through the first interconnection 604 and the second interconnection 606 from the left to the right in FIG. 15. Because the first interconnection 604 and the second interconnection 606 are composed of a metal material likely to cause electromigration, sustained flow of the current allows the constituent metal of the first interconnection 604 and 600 to migrate towards the gap 608, and thereby the gap 608 gradually increases the electro-conductivity. After a predetermined number of times of use of the tag has reached, the gap 608 turns into conductive and short-circuits the first interconnection 604 and the second interconnection 606. The function of RFID tag is thus nullified.

The first interconnection 604 and the second interconnection 606 are preferably configured using the same metal material likely to cause electro-migration. Exemplary metal materials include silver, aluminum and so forth. The substrate 602 and the gap 608 are configured using an insulating material. For example, single crystal silicon, glass and so forth are preferably used. The distance between the first interconnection 604 and the second interconnection 606 is adjusted so that a current path can be formed therebetween by the migrated metal material. It is adjusted for example to 1 nm or more and 100 nm or less. The distance between the interconnections in the parallel direction may typically be adjusted to 100 nm or more and 100 µm or less. This method ensures a typical time limit for operation of one month to 10 years. The time limit is adjustable based on a material composing the interconnections, design dimension of the gap, species of material, species of atmospheric gas and so forth.

Fifth Embodiment

Besides the mechanism based on exposure to the air as described in the above embodiment, the time switch using the narrow metal line can also adopt a mechanism using an oxidizer disposed in a certain space and allowing it to proceed active oxidation. This embodiment relates to mechanism by which the narrow metal line is turned into non-conductive through oxidation by such oxidizer.

Figure 16:
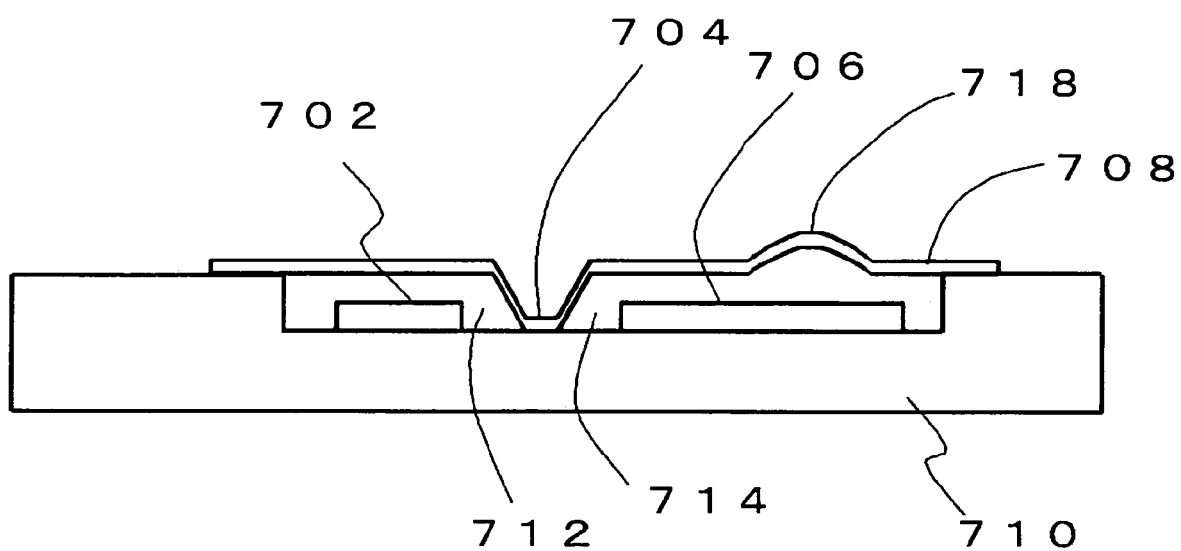
FIG. 16 is a drawing showing an exemplary specific configuration of the time switch.

FIG. 16 shows an exemplary configuration of the nullification mechanism including a time switch using the oxidizer. A substrate 710 has a recess formed on the surface thereof, and a seal material 708 is provided so as to cover the recess. The seal material 708 is fused with the substrate 710 at a predetermined position in the recess, to thereby form a sealed portion 704. A first compartment 712 and a second compartment 714 formed by the seal material 708 and the substrate 710 are provided with a nullification switch 702 and an oxidizer 706, respectively. The inner space of the first compartment 712 is filled with an inert gas such as nitrogen, argon or the like. The nullification switch 702 adopted herein is the narrow metal line explained in the third embodiment.

The oxidizer 706 is preferably solid oxidizer, wherein examples of which include inorganic peroxides such as potassium peroxide, sodium peroxide, calcium peroxide, magnesium peroxide and barium peroxide; and perchlorates such as potassium perchlorate, sodium perchlorate and ammonium perchlorate.

The configuration illustrated herein shows a pre-use state of the ID tag, wherein the time switch is activated by cutting the sealed portion 704 off from the substrate 710 at the beginning of use. In the pre-use state, a convex portion 718 is provided to the seal material 708 on the second compartment 714 side thereof, and is designed so as to break the sealed portion 704 by pressing it. Once the sealed portion 704 is separated from the substrate 710, the first compartment 712 and the second compartment 714 are communicated, and the nullification switch 702 is exposed to an oxidative gas (oxygen in this case) ascribable to the oxidizer 706. This allows oxidation of the narrow metal line to proceed, makes it non-conductive after elapse of a predetermined length of time, and thereby the ID tag is nullified.

This embodiment allows arbitrary setting of the time of beginning of use, and thereby makes it possible to realize the ID tag adaptive to various applications. It is also made possible to exactly adjust the length of time before nullification, by appropriately adjusting species and amount of use of 706, or adjusting the volume of the space formed by the first compartment 712 and the second compartment 714.

The embodiments of the present invention have been described in the above referring to the attached drawings, allowing adoption of various configurations other than those described in the above.

For example, addition of a counter or a DC-DC converter to the peripheral portion makes it possible to improve accuracy of specifying the number of times of use, or to absorb difference between source voltage required by the RFID and voltage required for operation of the solid electrolyte switch 300. It is also allowable to configure the tag as having a fuse, so as to activate the nullification switch by blowing the fuse.

In the embodiment using the narrow metal line, the narrow metal line may have an antioxidant appropriately adhered on the surface thereof. This configuration can suppress oxidation of the narrow metal line, and elongate the service life of the ID tag. Adjustment of the amount of adhesion also makes it possible to accurately control the service life. The antioxidant is appropriately selected depending on a material composing the narrow metal line, wherein benzotriazole and its derivatives are preferably used for the case where copper is used.

The individual embodiments described in the above may be configured as having a plurality of time switches. These time switches may be differed from each other in the time limit for operation, and further may be configured so that arbitrary time switch can be activated with the aid of a start unit.

In the embodiments described in the above, the time switch may be provided with a pair of short-circuiting terminals on both ends thereof. The "regeneration terminal" shown in FIG. 5 in the above is an example of such short-circuiting terminal. The regeneration terminal shown in FIG. 5 also has a function of a short-circuiting terminal, wherein short-circuiting between the terminals can also nullify the function of the nullification switch.

EXAMPLES

Example 1

Figure 18:
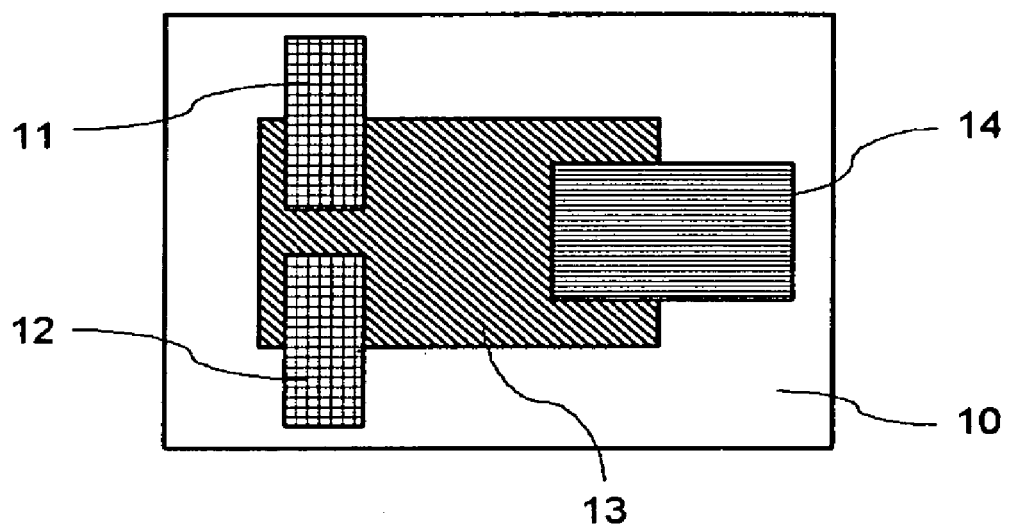
FIG. 18 is a plan view showing a configuration of an RFID time nullification switch according to an embodiment.

A first example of the RFID time nullification switch will be shown below. FIG. 18 is a plan view showing a configuration of the an RFID time nullification switch 1 of this example. The RFID time nullification switch 1 has, on the substrate 10, a first interconnection 11 and a second interconnection 12 serving as both terminals of the RFID time nullification switch, a solid electrolyte film 13 disposed between the first interconnection 11 and the second interconnection 12, and an ion supplying electrode 14 disposed in adjacent to the solid electrolyte film 13.

(Configurations of Individual Constituents)

Individual constituents composing the RFID time nullification switch 1 will be detailed below.

The substrate 10 on which the RFID time nullification switch 1 is formed is preferably such as being composed of an insulating material at least in the surficial portion thereof. For example, a plastic substrate, or a silicon substrate covered with an insulating film, such as a silicon oxide film substrate, is preferable.

The first interconnection 11 and the second interconnection 12 are preferably composed of a material less likely to solubilize in a form of ion into the solid electrolyte film 13, such as gold, titanium, aluminum or tungsten. Thickness of the first interconnection 11 and the second interconnection 12 was adjusted to 100 nm in this example, without limiting the applicable range of thickness to that value. It is, however, to be noted that a thickness of as much as 10 nm or more is preferably ensured, as a thickness allowing fabrication of a desirable electrode having a low interconnection resistance and being free from disconnection over steps.

The distance between the first interconnection 11 and the second interconnection 12 was adjusted to 200 μm in this example, without limiting the applicable range of distance to that value. It is, however, to be noted from the viewpoint of cost that a preferable distance is 200 nm or more, considered as being a distance attainable by a photolithographic technique.

A material composing the solid electrolyte film 13 is preferably a solid electrolyte composed of at least a plurality of elements. The material may also be such as allowing a constitutive element of the ion supplying electrode 14 in a form of ion to dissolve into the solid electrolyte film 13 while keeping its solid state, and acting as a solid electrolyte in thus dissolved state. It is still also allowable to use a material allowing at least one element to migrate in a form of ion through the solid electrolyte film 13, consequently making it possible to vary the compositional ratio of constitutive elements of the material, and can vary the conductivity of the material corresponding to changes in the compositional ratio. For example, such materials that likely cause migration of metal ion, such as chalcogenide materials containing copper and silver, such as copper sulfide and silver sulfide, and mixture of these materials can be used.

The thickness of the solid electrolyte film 13 in this example was adjusted to 40 nm, without limiting the applicable range of thickness to that value, and can be selected so that resistivity values under conduction and under isolation satisfy the design values. It is, however, to be noted that a preferable thickness is 20 nm or more, considered as being a thickness not causative of degradation of the solid electrolyte material due to influence of surface oxidation or the like, and as being enough for imparting a bulk-level property of the solid electrolyte to the film.

The ion supplying electrode 14 is preferably composed of a material capable of dissolving, in a form of ion, into the solid electrolyte film 13. The material composing the ion supplying electrode 14 may be a simple metal composed of a metal element same with the compositional element of the solid electrolyte film 13, or maybe an alloy containing the metal. The ion supplying electrode 14 is preferably such as supplying a species of metal same as the metal composing the solid electrolyte film 13. For the case where the solid electrolyte film 13 is composed of a metal chalcogenide, the ion supplying electrode 14 is preferably such as supplying a metal composing the metal chalcogenide. More specifically, for the case where the solid electrolyte film 13 is composed of copper sulfide, the ion supplying electrode 14 is preferably composed of a copper-containing metal. For the case where the solid electrolyte film 13 is composed of silver sulfide, the ion supplying electrode 14 is preferably composed of a silver-containing metal.

The thickness of the ion supplying electrode 14 in this example was adjusted to 50 nm, without limiting the applicable range of thickness to that value. It is, however, to be noted that a preferable thickness is 20 nm or more, considered as being enough for supplying ion.

The time nullification switch 1 as configured in the above can be fabricated by a simple lithographic technique, without needing any complicated circuit, so that it is made possible to fabricate the time nullification switch on the ID tag at low costs.

(Principle of Operation)

Figure 19:
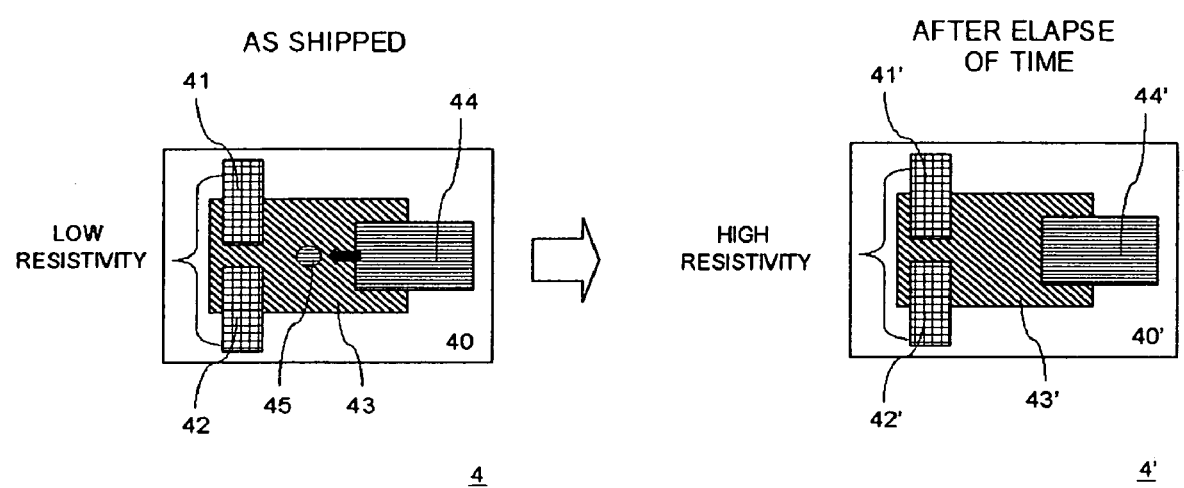
FIG. 19 is a drawing explaining a principle of operation of the RFID time nullification switch according to an embodiment.

FIG. 19 is a drawing explaining a principle of operation of the time nullification switch 1 described in the above. A time nullification switch 4 as shipped and an RFID time nullification switch 4' after elapse of time are comparatively shown. A basic principle of operation of the time nullification switch 1 is based on diffusion of copper ion in copper sulfide which composes the solid electrolyte film 13, and changes in the electric resistivity accompanied by changes in the copper composition. A stoichiometric copper sulfide is known to have a copper composition of copper:sulfur=2:1, wherein a single copper sulfide film formed by a generally-known method results in formation of a large number of copper deficiency, giving copper:sulfur=2−x:1, where x is approximately 0.02 to 0.2. Because copper sulfide is a semiconductor showing p-type electric conduction, the copper deficiency acts as an acceptor, and provides a hole carrying current. The electric conductivity of copper sulfide therefore decreases as the copper deficiency increases. In other words, as deposited, a single film of copper sulfide has a low electric conductivity. The electric resistance between the first interconnection 41 and the second interconnection 42 is therefore low, and the time nullification switch 4 as shipped is kept in a conduction state with low resistivity. On the other hand, when a copper electrode 44 is brought into contact with a copper sulfide 43 having copper deficiency, a copper ion 45 released by ionization from the copper electrode 44 diffuses into the copper sulfide 43 until a composition of copper:sulfur=2:1 is attained. This is a chemical reaction expressing that a system of contact between copper sulfide and copper approaches an equilibrium. The final equilibrium state of the system of contact between copper sulfide and copper is copper sulfide 43' having a composition of copper:sulfur=2:1. When copper diffusion progresses with time from a state having much copper deficiency formed therein towards the equilibrium, the number of copper deficiency capable of acting as acceptors decreases, so that the electric resistance raises due to decrease in holes capable of carrying current. As a consequence, the electric resistance between the first interconnection 41' and the second interconnection 42' after elapse of time increases, and the RFID time nullification switch 4' of the present invention turns into non-conductive with a high resistivity.

Figure 20:
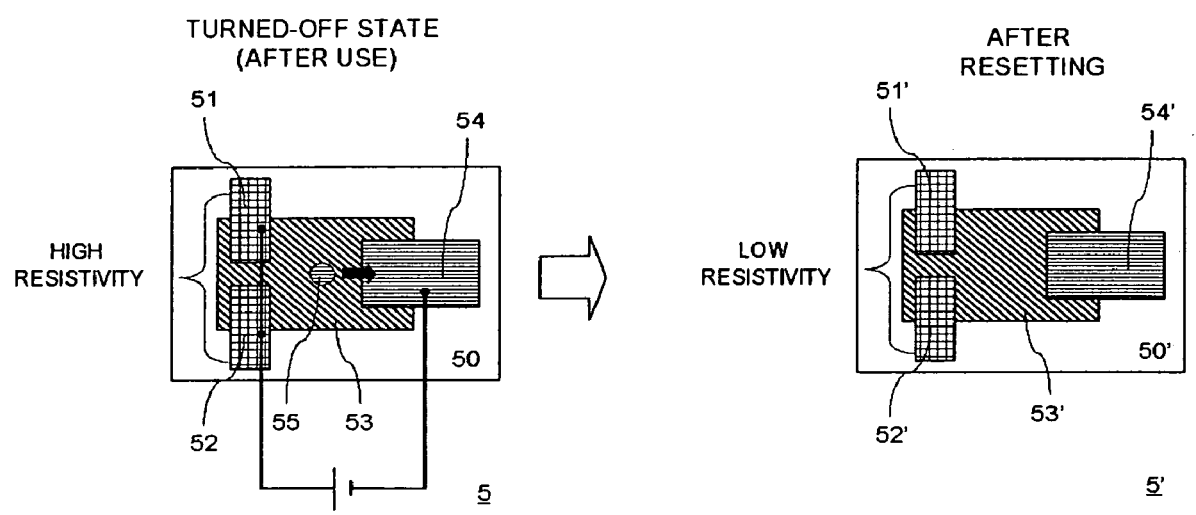
FIG. 20 is a drawing explaining a technique of controlling copper composition in a copper sulfide film.

As can be understood from the above explanation on the principle of operation, in the time nullification switch 1 of the present invention, application of an appropriate voltage to the individual electrodes makes it possible to control the copper composition of the copper sulfide film 13. FIG. 20 is a drawing explaining this technique. A time nullification switch 5 after use, that is, in the non-conductive state, and an RFID time nullification switch 5' after being reset by applying voltage are comparatively shown. For example, by grounding the ion supplying electrode 54 and by fixing the first interconnection 51 and the second interconnection 52 at the same positive potential, a copper ion 55 in a copper sulfide film 53 having a composition of copper:sulfur=2:1 diffuses towards the ion supplying electrode 54, and returns back into the ion supplying electrode 54. In a state after resetting, the copper composition of the copper sulfide film 53' returns to copper:sulfur=2−x:1, and the electric resistance of the copper sulfide film 53' decreases again. Making use of the phenomenon, the copper sulfide film 53 can be returned to an initial state (with a copper composition of copper:sulfur=2−x:1), so that it is made possible, by resetting, to recycle or initialize the time nullification switch 1 of the present invention.

(Experiments)

Figure 21:
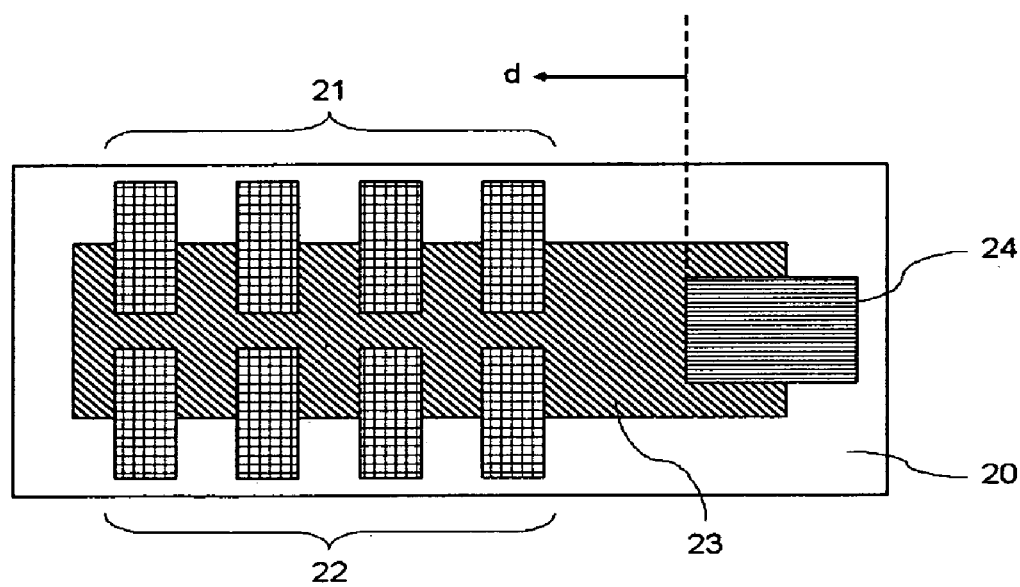
FIG. 21 is a schematic drawing showing an exemplary time nullification switch according to an embodiment.

FIG. 21 is a schematic drawing of a switch structure fabricated on a silicon oxide film substrate 20, for the purpose of showing operations of the time nullification switch 1 of this experiment. A first interconnection group 21 and a second interconnection group 22 are composed of titanium, and the first interconnection group 21 and the second interconnection group 22 were spaced 0.2 mm apart. Copper sulfide was used for a solid electrolyte film 23, and copper for an ion supplying electrode 24. The distance d between the first interconnection group 21 or the second interconnection group 22 and the ion supplying electrode 24 was varied from 0.3 mm to 6.4 mm.

Figure 22:
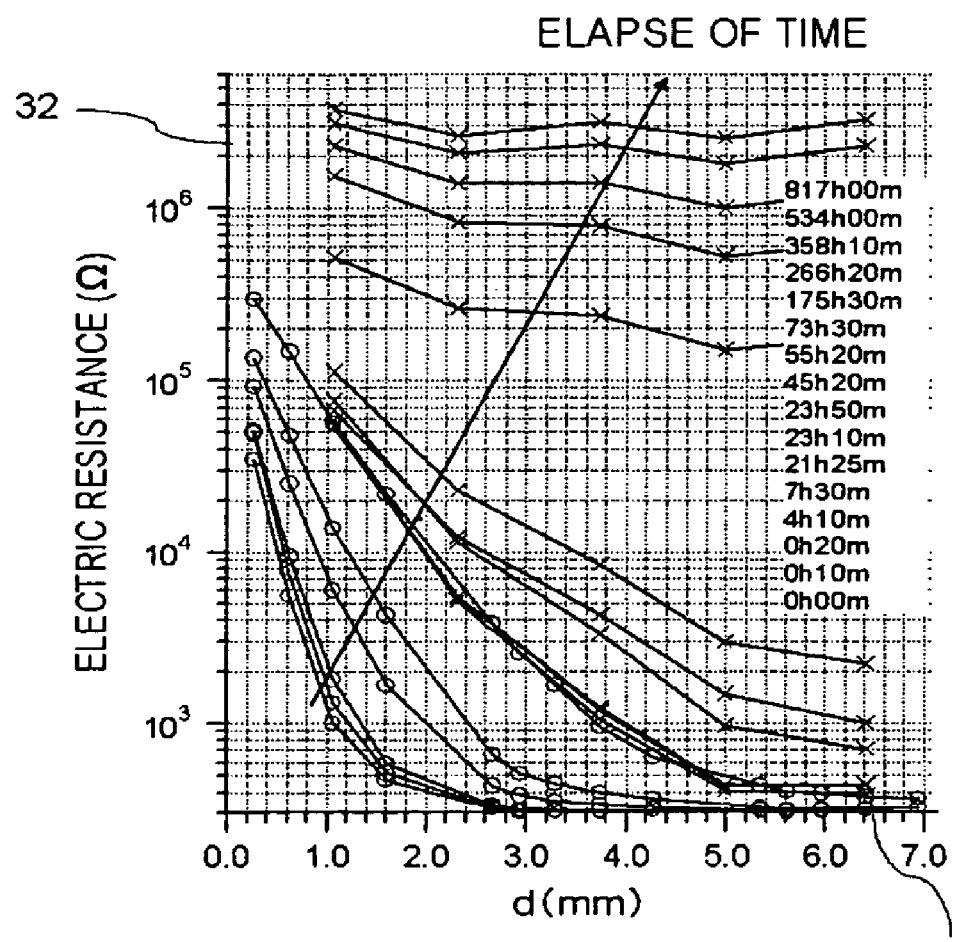
FIG. 22 is a drawing showing changes in electric resistivity between a first interconnection group and a second interconnection group of the time nullification switch according to an embodiment.

FIG. 22 is a graph showing the electric resistance between the first interconnection group 21 and the second interconnection group 22 varying with elapse of time after the ion supplying electrode 24 is formed. The abscissa 31 represents the distance d between the first interconnection group 21 or the second interconnection group 22 and the ion supplying electrode 24, and the ordinate 32 represents the electric resistance between the first interconnection group 21 and the second interconnection group 22. Numerals shown on the right of the drawing denote the elapsed time. For example, "817 h00 m" means 817 hours and 0 minute.

It is known from the results shown in FIG. 22 that the electric resistance between the first interconnection group 21 and the second interconnection group 22 increases with time at any points of the distance d. It is also known that a larger distance d needs a longer time to increase the electric resistance. More specifically, at a point of d=6.4 mm, the resistance which had been 300Ω for the initial stage increased to as high as 1 MΩ or around after 360 hours. In other words, this is understood that the electric resistance between the first interconnection group 21 and the second interconnection group 22, which had been indicative of a conductive state for the initial stage, phased into a non-conductive state after 360 hours (=15 days) has elapsed. That is, there was shown an operation of the time switch which phased from the conductive state into the non-conductive state after elapse of predetermined time.

Using this time switch, the ID tag as described below can be configured. For example, it is allowable to dispose the first interconnection group 21 and the second interconnection group 22 of the time switch so as to be inserted into interconnection of the power source circuit. In the ID tag in the above-described embodiment, the time switch of this example is applicable to the nullification mechanism 110 of the ID tag shown in FIG. 1, or to the time switch 112 of the ID tag shown in FIG. 10.

The time switch of this example is kept turned on in the initial stage thereof, so as to make the tag available by conduction through the interconnection. After the elapse of a predetermined length of time, the interconnection phases into the non-conductive state so as to automatically interrupt the power supply, to thereby disable, or nullify the tag. If the first interconnection group 21 and the second interconnection group 22 are disposed so as to short-circuit the interconnections of the power source circuit, the ID tag can also be configured as disabling the power source in the initial stage thereof due to short-circuiting, but making the tag available only after the path between the first interconnection group 21 and the second interconnection group 22 phases into the non-conductive state after the elapse of a predetermined length of time. It is also obvious from the results shown in FIG. 22 that the length of time required for phasing from conductive into non-conductive can be controlled by varying the distance d between the first interconnection group 21 or the second interconnection group 22 and the ion supplying electrode 24.

(Control of Length of Time before Turned Off)

Figure 23:
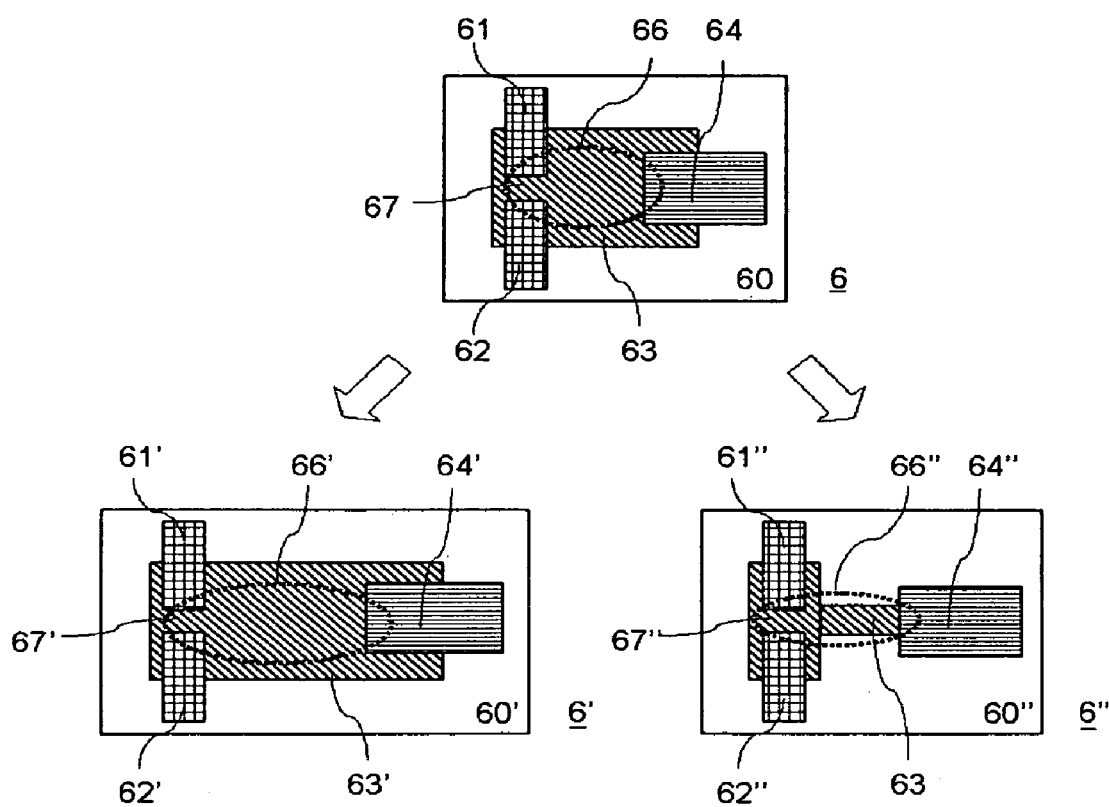
FIG. 23 is a drawing showing an exemplary configuration elongating the time limit for turning-off based on profile control of an ion conduction region.

The time nullification switch 1 operates based on diffusion of ion from the ion supplying electrode 14 towards the first interconnection 11 and the second interconnection 12. The length of time required for turning the switch off can, therefore, be controlled by a profile of a ion conduction region which extends from the ion supplying electrode 14 to the first interconnection 11 and the second interconnection 12 in the solid electrolyte 13 of the time nullification switch 1. In view of elongating the length of time before turning the switch off, one possible configuration is such as shown in FIG. 23. There are shown two types of a time nullification switch 6' and a time nullification switch 6", obtained by modifying the profile of an ion conduction region 66 in the time nullification switch 6 having a conventional element size. The time nullification switch 6', having disposed therein an ion conduction region 66' elongated from that of the ion conduction region 66 in the time nullification switch 6, takes a longer time for diffusion of copper ion, so that the length of time for attaining a copper composition of copper:sulfur=2:1 of a solid electrolyte 67' between a first interconnection 61' and a second interconnection 62' can be elongated. On the other hand, it is also effective to adopt a technique of narrowing the ion conduction region 66" as shown in a time nullification switch 6", as compared with the ion conduction region 66 in the time nullification switch 6. This is because, under narrowing of the ion conduction region 66", a total amount of ions reaching the first interconnection 61" and the second interconnection 62" relatively decreases after the elapse of time, as compared with the time nullification switch 6 having the wider ion conduction region 66, so that the length of time for attaining a copper composition of copper:sulfur=2:1 of a solid electrolyte 67" between a first interconnection 61" and a second interconnection 62" can be elongated. As has been explained in the above, the length of time before turning off the time nullification switch 1 of the present invention can be controlled based on a profile of the region (ion conduction region) extending from (i) the portion between the first and the second interconnections, to (ii) the ion supplying layer. The ID tag may also be configured as having a plurality of switches thus adjusted in the length of time before turning-off.

Example 2

Use of different characteristics of various solid electrolyte films is successful in imparting additional values to the time nullification switch.

In general, diffusion of a substance proceeds under a certain level of activation energy. The activation energy largely varies depending on what substance diffuses in what diffusion medium. Assuming the activation energy as Ea, diffusion coefficient D can be expressed as:

$$D = D_0 \exp(-Ea/kT)$$

where $D_0$ is a constant, k is Boltzmann's constant, and T is temperature. What is obvious from the equation is that the diffusion is very susceptible to temperature. Diffusion length L is an important parameter in the time nullification switch of this example, expressed as:

$L = (Dt)_{1/2}$ (t is time allowing diffusion to proceed), showing that activation energy Ea and temperature T are parameters which determine the time limit for operation of the time nullification switch.

Figure 24:
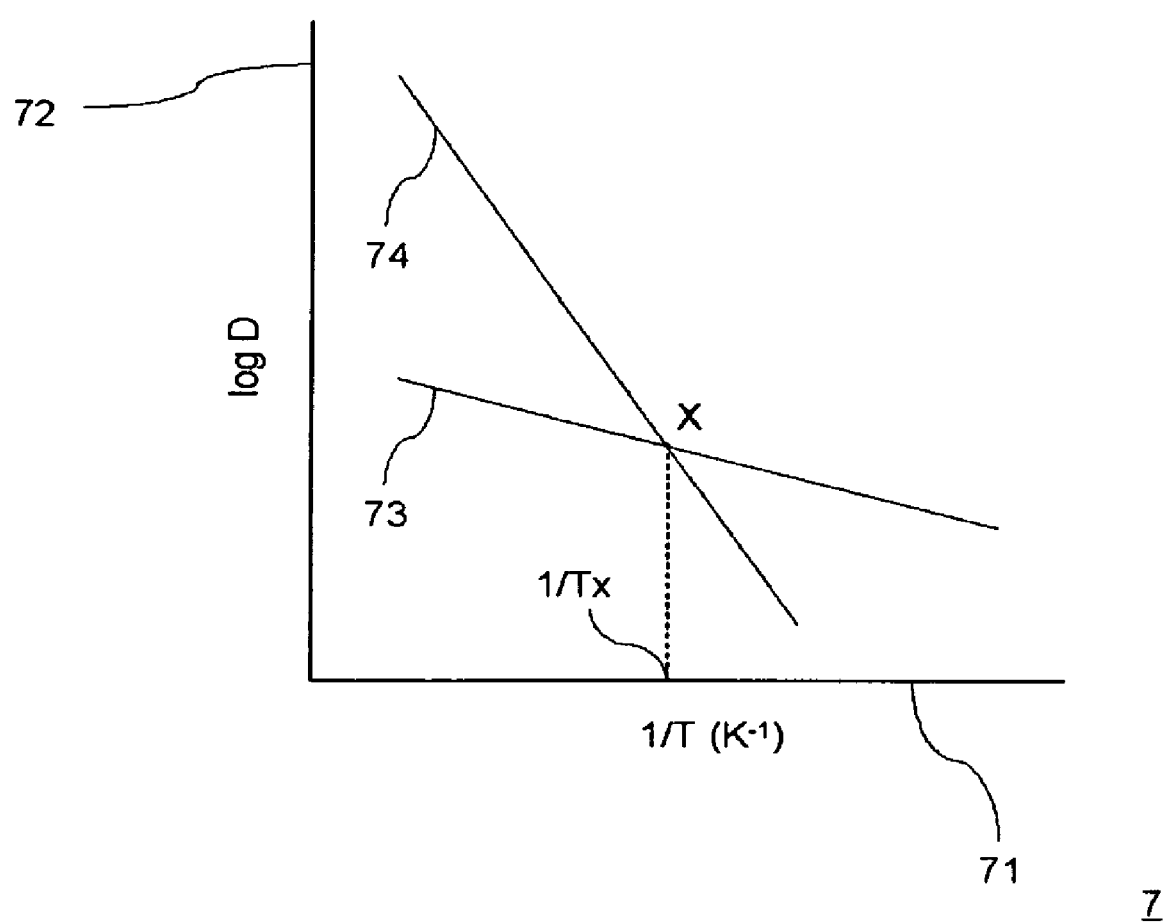
FIG. 24 is a graph showing logarithm of two diffusion coefficients based on different activation energies $E_a$, $E_a'$ ($E_a < E_a'$) (ordinate 72) expressed as functions of inverse of temperature T (abscissa 71)

FIG. 24 is a graph showing logarithm (ordinate 72) of two diffusion coefficients D, D' involving different activation energies Ea, Ea' (Ea<Ea') as functions of inverse of temperature T (abscissa 71). There are shown straight lines 73, 74 having different slopes ascribable to different activation energies Ea, Ea' (Ea<Ea'). At point X indicated in the drawing, or at temperature Tx, two diffusion coefficients agrees as D=D'. It is known that D is larger on the lower temperature side of Tx, or further on the right side, and D' is larger on the higher temperature side, or further on the left side. Based on the principle, it was made possible to form the time nullification switch susceptible to temperature change.

Figure 25:
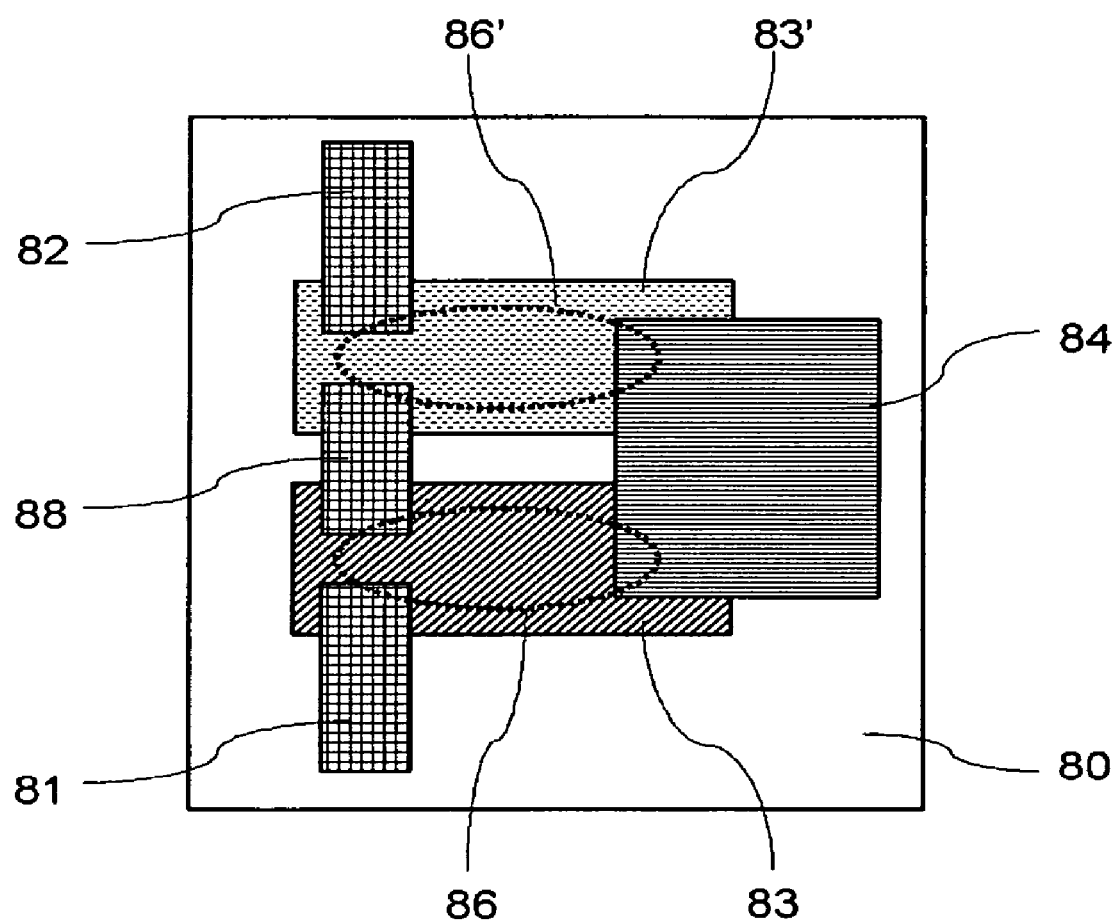
FIG. 25 is a drawing showing an exemplary configuration of the time nullification switch having two solid electrolytes based on different activation energies $E_a$, $E_a'$ ($E_a < E_a'$) as the ion conduction region.

FIG. 25 is a drawing showing a configuration of a time nullification switch 8 having, as the ion conduction region, two types of solid electrolytes having different activation energies Ea, Ea' (Ea<Ea'). FIG. 25 shows a time nullification switch 8 having, on a substrate 80, a first interconnection 81 and a second interconnection 82 which serve as both terminals of the time nullification switch 8; two types of solid electrolyte film 83, 83' disposed in adjacent to the first interconnection 81 and the second interconnection 82, respectively, having different activation energies Ea, Ea' (Ea<Ea'); a third interconnection 88 connecting the solid electrolyte film 83 and the solid electrolyte film 83'; and a common ion supplying electrode 84 disposed in adjacent to the electrolyte films 83, 83'. In other words, this time nullification switch 8 includes:

a first and a second solid electrolyte films (83, 83' provided on a base as being spaced from each other;

a first conductor (first interconnection 81) provided in contact with the first solid electrolyte film;

a second conductor (third interconnection 88) provided in contact with both of the first and the second solid electrolyte films;

a third conductor (second interconnection 82) provided in contact with the second solid electrolyte film; and a metal ion supplying section (ion supplying electrode 84) provided in contact with both of the first and the second solid electrolyte films, as being spaced from the first, the second and the third conductors.

The first and the second solid electrolyte films (83, 83') are respectively composed of different materials. The first and the second conductors (first interconnection 81, third interconnection 88), and the second and the third conductors (third interconnection 88, second interconnection 82) are provided respectively as being spaced by a predetermined distance from each other.

In the ID tag having a circuit which includes an antenna and an IC chip, the time nullification switch 8 is provided in the circuit, and is used as a time switch isolating the circuit when a predetermined time limit for operation has reached. The first and third conductors (first interconnection 81 and second interconnection 82) are respectively connected to the circuit.

The substrate 80 on which the time nullification switch 1 is formed is preferably such as being composed of an insulating material at least in the surficial portion thereof, for which a plastic substrate or a silicon oxide film substrate is preferably used. The first interconnection 81, the second interconnection 82 and the third interconnection 88 are preferably composed of a material such as gold, titanium, aluminum and tungsten, which are less likely to dissolve in a form of ion into the solid electrolyte films 83, 83'. The thickness of the first interconnection 81, the second interconnection 82 and the third interconnection 88 may typically be 10 nm or more. The distance between the first interconnection 81 and the third interconnection 88, and the distance between the second interconnection 82 and the third interconnection 88 may typically be 200 nm or more. The solid electrolyte films 83, 83' are preferably composed of a chalcogenide material containing copper or silver, such as copper sulfide or silver sulfide. The thickness of the solid electrolyte film 83, 83' is preferably 20 nm or more for example. On the other hand, the ion supplying electrode 84 is preferably composed of a material capable of dissolving into the solid electrolyte films 83, 83' in a form of ion.

The ion supplying electrode 14 is preferably such as supplying a species of metal same as the metal composing the solid electrolyte film 13. For the case where the solid electrolyte film 13 is composed of a metal chalcogenide, the ion supplying electrode 14 is preferably such as supplying a metal composing the metal chalcogenide. More specifically, for the case where the solid electrolyte film 13 is composed of copper sulfide, the ion supplying electrode 14 is preferably composed of a copper-containing metal. For the case where the solid electrolyte film 13 is composed of silver sulfide, the ion supplying electrode 14 is preferably composed of a silver-containing metal.

The thickness of the ion supplying electrode 84 may typically be 20 nm or more. Thus-configured time nullification switch 1 can be fabricated by a simple lithographic technique, without needing any complicated circuit, so that it is made possible to fabricate the time nullification switch on the RFID at low costs.

The time nullification switch 8 shown in FIG. 25 showed operation same as that of the time nullification switch 1 shown in FIG. 18, at normal temperature of use. More specifically, as a result of diffusion of ion, generated from the ion supplying electrode 84, through a ion conduction region 86, the electric resistance between the interconnection 81 and the third interconnection 88 increased, and thereby an off state arose between the first interconnection 81 and the second interconnection 82 which serve as both terminals of the time nullification switch 8. On the other hand, in the time nullification switch 8 of this example, which has undergone through a temperature environment higher than the normal temperature of use, the ion generated from the ion supplying electrode 84 diffused through an ion conduction region 86' at a speed larger than in the normal ion conduction region 86. As a consequence, the electric resistance between the second interconnection 82 and the third interconnection 88 increased, and an off state arose between the first interconnection 81 and the second interconnection 82 which serve as both terminals of the time nullification switch 8, within a shorter period than usual.

By using the time nullification switch 8, the ID tag, having undergone through a temperature condition higher than the normal temperature of use for a certain period or longer in its temperature history, can be turned off within a shorter period than in the case of turning-off at the normal temperature condition. The inverted use thereof also makes it possible to configure the ID tag so as to turn off within a shorter period than in the case of turning-off at the normal temperature condition, when the ID tag has undergone through a temperature condition lower than the normal temperature of use for a certain period or longer. While two solid electrolyte films in this example were integrated on a single substrate, it is of course also allowable to fabricate them on separate substrates. The integration is advantageous in downsizing, and the fabrication on the separate substrates is advantageous in improving the yield ratio. Methods of connection are not only limited to series connection, wherein parallel connection and independent use are also permissible. In the parallel use, the turn-off time of the switch as a whole is determined by an electrolytic film allowing a slow diffusion therethrough.

In the independent use of the time switches, average temperature in the temperature history and average elapse of time can independently be determined, typically by measuring increase in the resistivity value of the individual switches.

As has been described in the above, by configuring the time switch using a plurality of electrolytic films having different activation energies, it was also made possible to detect whether any abnormality occurred or not in the temperature history the ID tag has undergone, and to know history of temperature control for foods and so forth.

Examples of the time nullification switch used for the ID tag of the present invention have been described. Field of application of the time nullification switch clarified in the present invention is not limited to ID tags, and is applicable to any other possible fields as the time nullification switch. The switch can exactly be turned off by its principle, and does not need any complicated circuits. It is also easy to control the time before being turned off, based on profile of the ion conduction region. The time nullification switch of the present invention is also recyclable. Cost for fabricating the time nullification switch of the present invention can, therefore, be minimized by recycling, and will be an useful element in the ID tag market with prospect of a large increase in demand. Use of two or more solid electrolytes differed in the ion conduction characteristics also makes it possible to form the time nullification switch having an additional value such as monitoring of high temperature history.

The invention claimed is:

1. An ID tag comprising an antenna, a circuit which includes an IC chip, and a nullification unit isolating said circuit from said antenna;
    wherein said nullification unit includes a time switch isolating said circuit when a predetermined time limit for operation has reached after the start of use of the ID tag.
2. The ID tag as claimed in claim 1,
    wherein said time switch includes a start unit activating said time switch, and
    said time switch is configured so as to isolate said circuit when a predetermined time limit for operation has reached after said time switch was activated by said start unit.
3. The ID tag as claimed in claim 1,
    wherein said time switch is provided in said circuit, and is configured as being switched internally from a conduction state to a non-conduction state so as to isolate said circuit, when said predetermined time limit for operation has reached.
4. The ID tag as claimed in claim 1,
    wherein said time switch is a switching element comprising:
    a first electrode and a second electrode provided in said circuit in parallel with each other, as being spaced by a predetermined distance; and
    a solid electrolyte film held between these electrode, having a metal ion supplying section provided in contact with said solid electrolyte film.
5. The ID tag as claimed in claim 4,
    wherein said solid electrolyte film is composed of a metal chalcogenide.
6. The ID tag as claimed in claim 5,
    wherein said metal ion supplying section supplies a metal same as a metal composing said metal chalcogenide.
7. The ID tag as claimed in claim 4,
    wherein a pair of terminals forming a conduction channel in said solid electrolyte film is connected to said first and second electrodes.

8. The ID tag as claimed in claim 1,
    wherein said time switch comprises:
    a solid electrolyte film provided on a base;
    a first conductor provided in contact with said solid electrolyte film;
    a second conductor provided as being contact with said solid electrolyte film, and as being spaced by a predetermined distance from said first conductor; and
    a metal ion supplying section provided as being contact with said solid electrolyte film and as being spaced from said first and second conductors,
    said first and the second conductors being independently connected to said circuit.
9. The ID tag as claimed in claim 8,
    wherein said solid electrolyte film is configured as showing p-type conductivity in the initial state thereof, and
    as showing an insulating property after use, by being supplied with a metal from said metal ion supplying section.
10. The ID tag as claimed in claim 8,
    wherein said solid electrolyte film is composed of a metal chalcogenide.
11. The ID tag as claimed in claim 10,
    wherein said metal ion supplying section supplies a metal same as a metal composing said metal chalcogenide.
12. The ID tag as claimed in claim 11,
    wherein said metal chalcogenide contains a metal at an amount lesser than the stoichiometric composition.
13. The ID tag as claimed in claim 12,
    wherein said metal chalcogenide contains a metal at an amount lesser than the stoichiometric composition.
14. The ID tag as claimed in claim 8,
    wherein said time switch comprises:
    a first and a second solid electrolyte films provided as being spaced from each other on a base;
    a first conductor provided in contact with said first solid electrolyte film;
    a second conductor provided in contact with both of said first and second solid electrolyte films;
    a third conductor provided in contact with said second solid electrolyte film; and
    a metal ion supplying section provided in contact with both of said first and second solid electrolyte films, as being spaced from said first, second and third conductors,
    said first and second solid electrolyte films being respectively composed of different materials, and
    said first and second conductors, and said second and third conductors being respectively provided as being spaced by a predetermined distance from each other, and
    said first and third conductors being respectively connected to said circuit.
15. The ID tag as claimed in claim 1,
    wherein said time switch comprises a narrow conductor line provided in said circuit, an air-tight compartment housing said narrow conductor line, and a start unit breaking the air-tightness of said air-tight compartment to thereby introduce the air or an oxidative gas into the compartment,
    configured as allowing said narrow conductor line to be oxidized and so as to isolate said circuit, when a predetermined time limit for operation has reached after said time switch was activated by said start unit.
16. The ID tag as claimed in claim 15,
    further comprising an oxidant compartment including an oxidizer, and configured so that said oxidant compartment and said air-tight compartment are communicated when said start unit is functionalized.

17. The ID tag as claimed in claim 1,
wherein said time switch comprises:
a first metal interconnection and a second metal interconnection provided in said circuit in parallel with each other, as being spaced by a predetermined distance; and
and a gap portion disposed between said first and second metal interconnections,
configured as allowing said gap portion to turn into a conductive state so as to short-circuit said first and second metal interconnections to thereby isolate said circuit, when a predetermined time limit for operation has reached.

18. The ID tag as claimed in claim 2,
having a plurality of said time switches differ in the time limit for operation, and configured as allowing said start unit to activate an arbitrary time switch.

19. The ID tag as claimed in claim 1,
further comprising a pair of short-circuiting terminals on both ends of said time switch.

\* \* \* \* \*